(12) United States Patent
Li et al.

(10) Patent No.: US 8,803,489 B2
(45) Date of Patent: Aug. 12, 2014

(54) ADAPTIVE ON-TIME CONTROL FOR POWER FACTOR CORRECTION STAGE LIGHT LOAD EFFICIENCY

(75) Inventors: Qian Li, Blacksburg, VA (US); Fred C. Lee, Blacksburg, VA (US); Ming Xu, Blacksburg, VA (US); Chuanyun Wang, Jiangsu (CN)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 447 days.

(21) Appl. No.: 13/184,788

(22) Filed: Jul. 18, 2011

(65) Prior Publication Data

US 2012/0014148 A1    Jan. 19, 2012

Related U.S. Application Data

(60) Provisional application No. 61/364,842, filed on Jul. 16, 2010.

(51) Int. Cl.
*G05F 1/70* (2006.01)

(52) U.S. Cl.
USPC .............. 323/207; 323/272; 323/283; 363/89

(58) Field of Classification Search
USPC ............ 323/207, 211, 272, 283, 285; 363/89
See application file for complete search history.

(56) References Cited

U.S. PATENT DOCUMENTS

| | | | |
|---|---|---|---|
| 6,903,536 B2 * | 6/2005 | Yang | 323/266 |
| 2002/0093320 A1 * | 7/2002 | Van Auken | 323/282 |
| 2003/0161167 A1 * | 8/2003 | Barnett et al. | 363/72 |
| 2004/0095116 A1 * | 5/2004 | Kernahan et al. | 323/282 |
| 2008/0084721 A1 * | 4/2008 | Miramonti et al. | 363/89 |
| 2010/0110739 A1 * | 5/2010 | Nishikawa | 363/124 |
| 2010/0118573 A1 * | 5/2010 | Saint-Pierre | 363/126 |
| 2010/0127671 A1 * | 5/2010 | Lidstrom | 323/207 |

* cited by examiner

*Primary Examiner* — Adolf Berhane
*Assistant Examiner* — Fred E Finch, III
(74) *Attorney, Agent, or Firm* — Whitham, Curtis, Christofferson & Cook, P.C.

(57) ABSTRACT

Light load efficiency of a power factor correction circuit is improved by adaptive on-time control and providing for selection between a continuous conduction mode and a discontinuous conduction mode wherein the discontinuous conduction mode increases time between switching pulses controlling connection of a cyclically varying voltage to a filter/inductor that delivers a desired DC voltage and thus can greatly reduce the switching frequency at light loads where switching frequency related losses dominate efficiency. The mode for controlling switching is preferably selected for each switching pulse within a half cycle of the cyclically varying input voltage. A multi-phase embodiment allows cancellation of EMI noise at harmonics of the switching frequency and adaptive change of phase angle allows for cancellation of dominant higher order harmonics as switching frequency is reduced.

20 Claims, 24 Drawing Sheets

ADAPTIVE ON-TIME CONTROL FOR POWER FACTOR CORRECTION STAGE LIGHT LOAD EFFICIENCY

CROSS-REFERENCE TO RELATED APPLICATIONS

This application claims benefit of priority of U.S. Provisional Application 61/364,842, filed Jul. 16, 2010, which is hereby incorporated by reference in its entirety.

FIELD OF THE INVENTION

The present invention generally relates to power supply and power conversion circuits and, more particularly, to power factor correction circuits generally included therein and techniques for improving efficiency thereof over the load range for power supplied thereby.

BACKGROUND OF THE INVENTION

Many electrical and electronic devices, particularly industrial and consumer electronics devices require direct current (DC) power for operation although such power may be ultimately generated and distributed over a power grid as alternating current (AC) power. In many such devices, particularly those including relatively powerful or high performance processors, logic circuits and/or memories, the required DC voltage(s) must be closely regulated. Therefore inclusion of a power converter is a requirement of virtually all such devices although the power converter, itself, does not contribute to the ultimate function of the circuits to which power is supplied. Further, the power converter often represents a significant fraction of the cost of the electronics in such a device and the space and weight thereof may be comparable to the electronics themselves. Accordingly, efficiency of power delivery of the power converter is of paramount importance. The power density and complexity/cost of the power converter is of an importance which often closely approaches that of efficiency in power delivery.

A power converter, especially if it is to be connected to an AC power distribution grid typically has three stages: an electromagnetic interference (EMI) filter stage designed to prevent high frequencies such as switching transients from being transmitted back to the power distribution grid and/or radiated into the environment, a power factor correction (PFC) stage to prevent or minimize effects on the power distribution grid voltage or phase due to changes in load, and a regulator stage to maintain the voltage supplied within a very narrow range notwithstanding potentially large changes in the current supplied. The EMI filter stage does not generally present significant losses and efficiency of switching voltage regulators is relatively high at the present state of the art. On the other hand, depending on the noise magnitude and frequencies present in switching noise that may be generated, the EMI filter stage may be of significant complexity, size and weight and may thus compromise cost and power density of the complete power converter.

However, the PFC stage which generally provides AC to DC conversion and the regulator stage remain a significant contributors to operating losses in power converters. While switching regulator stage design has become highly sophisticated and relatively high efficiency can be achieved over wide load range, the design of PFC stage circuits has also become highly developed but high levels of efficiency have been achieved only for relatively narrow load ranges. The principal difficulty in achieving overall high efficiency arises when the load to which power is to be supplied varies more widely, as is particularly the case for modern semiconductor digital processors, logic circuits and memories which have recently become capable of extremely fast cycle times and high clock frequencies. As is known, an ideal transistor operated in a digital or binary mode, consumes power only during switching transitions and thus higher clock rates imply greater power consumption, even in ideal devices, while state-of-the-art semiconductor devices often operate in modes which are far from ideal and consume significant power in each of the binary states as well as during switching transitions. Further, such devices, upon receiving an input, perform associated processing at very high speed while reverting to a stand-by mode or even a so-called "sleep" mode until further input is received in order to conserve power (e.g. that may be supplied from a battery). Therefore, such devices exhibit a wide range of the load which they may present at any given time.

Thus, the PFC stage of power converters is also required to accommodate such a wide range of load as efficiently as possible. However, in PFC circuits developed to date, while capable of acceptable efficiency at full or near-full load by operating at a high, constant switching frequency using variable pulse width, that efficiency cannot be maintained at medium or light load where switching losses at the constant high frequency become dominant.

It is also known that light load efficiency can be achieved for PFC circuits by varying the switching frequency to reduce switching losses. However, it is increasingly being required that very high efficiency be maintained over the entire potential load range of the circuit(s) to which power is being supplied and it has been found that simply switching from one mode of operation to another mode of operation is inadequate to maintain a sufficiently high efficiency over the entire load range. Further, attempts to achieve some blending of modes of operation that may have been attempted to date have been similarly unsuccessful in achieving significant efficiency improvement while involving greatly increased complexity to the point of compromising power density, cost and weight of the power converter.

SUMMARY OF THE INVENTION

It is therefore an object of the present invention to provide a PFC stage for a power converter that can maintain high efficiency comparable to full load efficiency of a constant high frequency, variable on-time PFC stage over an extremely wide load range.

It is another object of the invention to provide a PFC stage for a power converter that can maintain high efficiency over an extreme load range in a sufficiently simple manner to allow significant improvements in power density at low cost.

In order to accomplish these and other objects of the invention, a method of operating a power factor correction circuit is provided comprising steps of applying a cyclically varying voltage to an input of said power factor correction circuit, performing switching to control conduction of pulses of current at the cyclically varying input voltage to a filter/inductor at a frequency, defining a switching cycle, which is sufficiently high to supply a predetermined current at a desired output voltage to a load, the switching defining a predetermined on-time and a predetermined off-time in accordance with the predetermined current and the desired voltage such that current through the filter/inductor is continuous in a continuous conduction mode, reducing the predetermined current supplied to supply a reduced current to the load, and reducing the frequency of the pulses by extending the off-time during at least a portion of a cycle of said cyclically varying voltage in accordances with the reducing of said predetermined current such that current through the filter/inductor is discontinuous in a discontinuous conduction mode.

In accordance with another aspect of the invention, a power converter circuit is provided comprising a switching circuit configured to conduct pulses of a cyclically varying voltage to a filter/inductor, an output for delivering a predetermined voltage developed by said filter/inductor to a DC/DC converter or a load, a controller for controlling the switching circuit to determine an on-time duration and an off-time duration in accordance with a current delivered to the DC/DC converter or load at a desired voltage, wherein the controller determines the off-time to establish one of a continuous conduction mode or a discontinuous conduction mode for respective pulses of the cyclically varying voltage in accordance with a magnitude of current and wherein, during discontinuous conduction mode, the controller controls the switching circuit such that the off-time includes periods when substantially zero current flows through said filter/inductor and frequency of the pulses is thereby reduced the said current is reduced.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
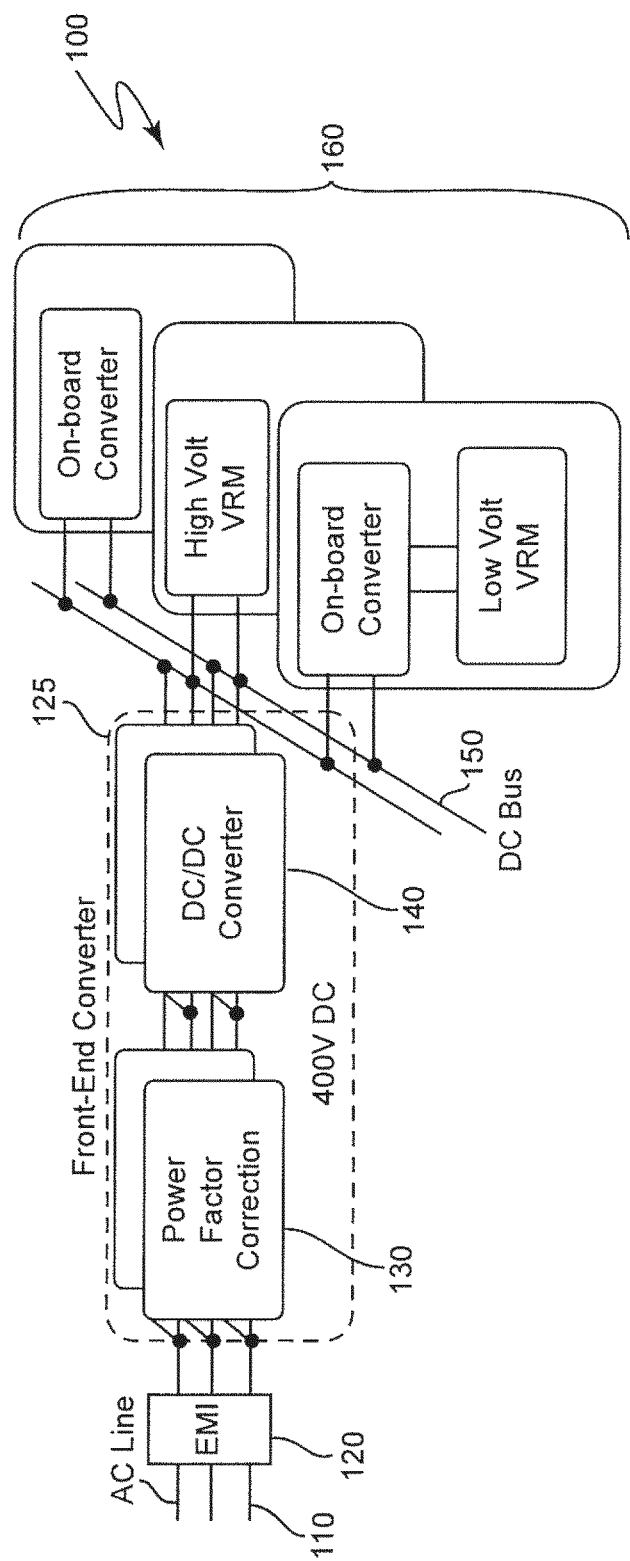
FIG. 1 is a high-level block diagram of a generalized AC-DC converter.

Referring now to the drawings, and more particularly to FIG. 1, there is shown a generalized high-level block diagram of an AC-DC converter 100 and its application to providing power to one or more systems within one or more electronic devices. AC power, for example, is initially provided from an AC distribution system 110 of one or more phases, three-phase power being illustrated as an example. It should be understood that power could alternatively be supplied from a DC source, such as a battery or DC generator such as a solar array. As alluded to above, an EMI filter 120 is generally provided to reduce noise from the front-end converter 125 and/or the load from being reflected back to the power source and/or radiated to the environment from which it could affect other devices or the power source, itself, such as by causing excess heating in a battery.

The front-end converter 125 includes a power factor correction (PFC) circuit 130 that develops DC power of approximately the required voltage to drive a DC-DC converter 140 which generally functions to provide regulation of an output DC voltage at a desired voltage within a required precision or tolerance. Depending on the particular application or electronic device that is to receive power, the output of the DC-DC converter may be applied to a distribution bus 150 to which any number of devices or systems 160 may be connected. For purposes of illustration, an on-board (e.g. point of load) converter, a high voltage regulator module (VRM) and a further on-board converter driving a low volt voltage regulator module (VRM) as would generally be provided for a digital processor, memory or logic array are shown as exemplary. More or fewer such loads 160 can be connected to bus 150.

For improved efficiency, switching circuits rather than analog circuits are customarily used for circuits 130, 140 and 160 since no significant voltage drop (consuming power and producing heat) is developed across them when a lower voltage is needed and voltages higher than the supply voltage can be produced by suitable circuits, often referred to collectively as boost converters. However, such switching necessarily produces some degree of noise which may be reflected back to the power source as alluded to above. In particular, the PFC circuit which performs the initial power conversion and has the principal function of avoiding changes in the load from affecting the power source produces a voltage which only approximates a desired voltage and will necessarily contain some degree of ripple at the switching frequency and harmonics thereof. Thus, the EMI filter 120 must attenuate not only switching noise from any and all downstream regulators but must principally attenuate noise, such as that due to ripple voltage, generated by the PFC circuit. The importance of these general observations will become increasingly apparent in the discussion of various perfecting features of the invention which will be described below since the size of the EMI filter required to sufficiently attenuate such noise can severely compromise the potential power density of the overall AC-DC converter even though the EMI filter is not generally a significant source of inefficiency and is otherwise unimportant to the basic principles of the invention to provide increased efficiency over a wide range of load.

Figure 2:
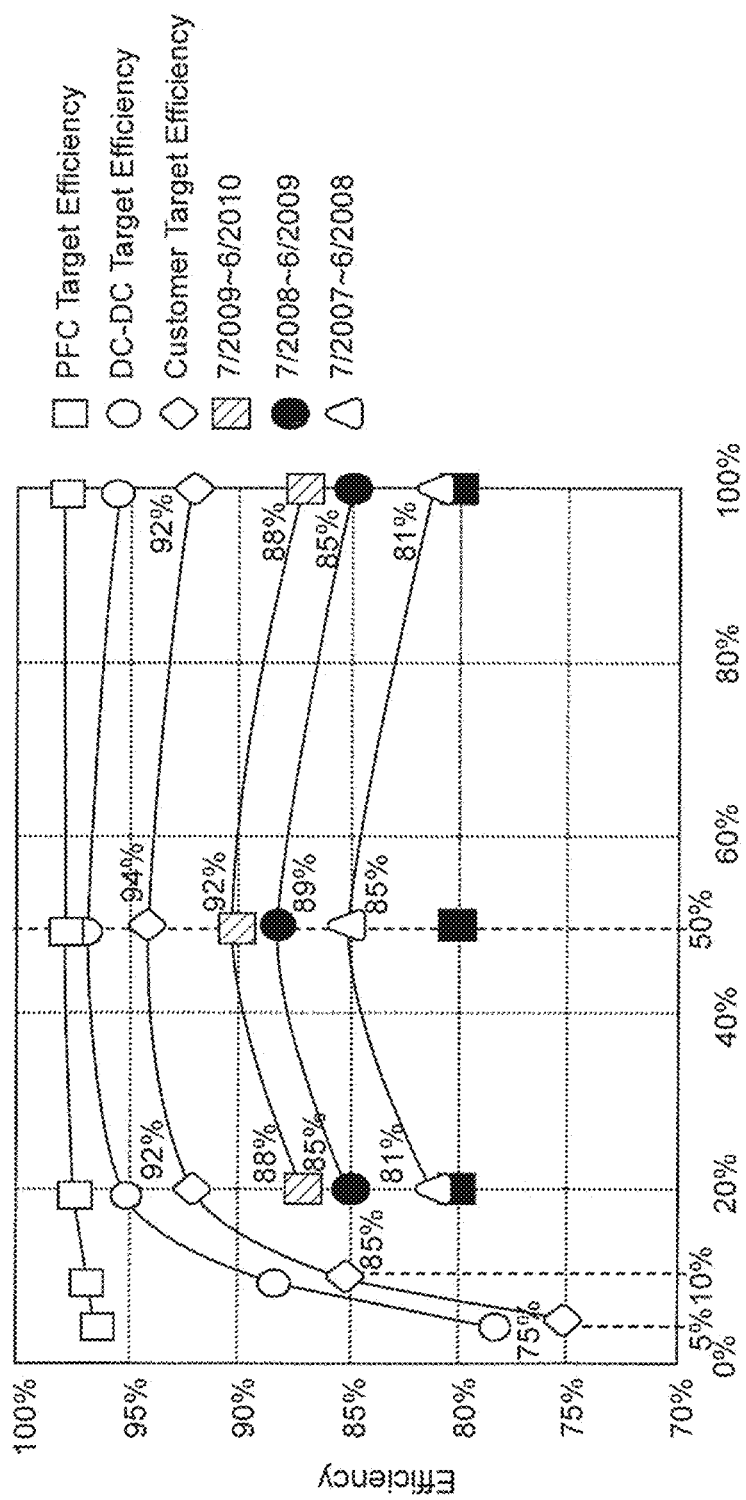
FIG. 2 is a graphic depiction of recent trends in requirements for power converter efficiency.

As alluded to above, increasing concerns for energy conservation and environmental protection as well as increased convenience of electronic device use, efficiency requirements of rapidly increasing stringency have been demanded by both industry regulation and by customers using various electronic devices. Referring now to FIG. 2, efficiency requirements as a fraction of full load for power converters and PFC circuits are graphically illustrated for various programs and date ranges. For example, the "80 Plus" program or certification requires a minimum 80% efficiency for a device, regardless of load. In consecutive twelve-month periods from mid-2007 to mid-2010 peak efficiencies at 50% load of 85%, 89% and 93% were required with no more than a 4% reduction from peak efficiency at 20% and 100% load. Customer target efficiency currently calls for 94% peak efficiency with no more than a 1% reduction at full (100%) load and a 2% reduction at 20% load and extends light load efficiency demands to a minimum of 85% at 10% load and 75% at 5% load. DC-DC target efficiency is even higher as is shown as PFC Target efficiency. In this latter regard, however, it should be noted that a much higher target efficiency for light loads is set for PFC stages than for DC-DC converter stages; 98% or higher between 20% load and full load and above and 96% or higher even at 5% load. This requirement can be readily understood by recalling that the overall power converter efficiency will be the product of the PFC efficiency and the regulator efficiency. A high PFC target efficiency over the entire load range thus assures that the overall efficiency of the power converter will be very close to the efficiency of the voltage regulator stage.

Figure 3:
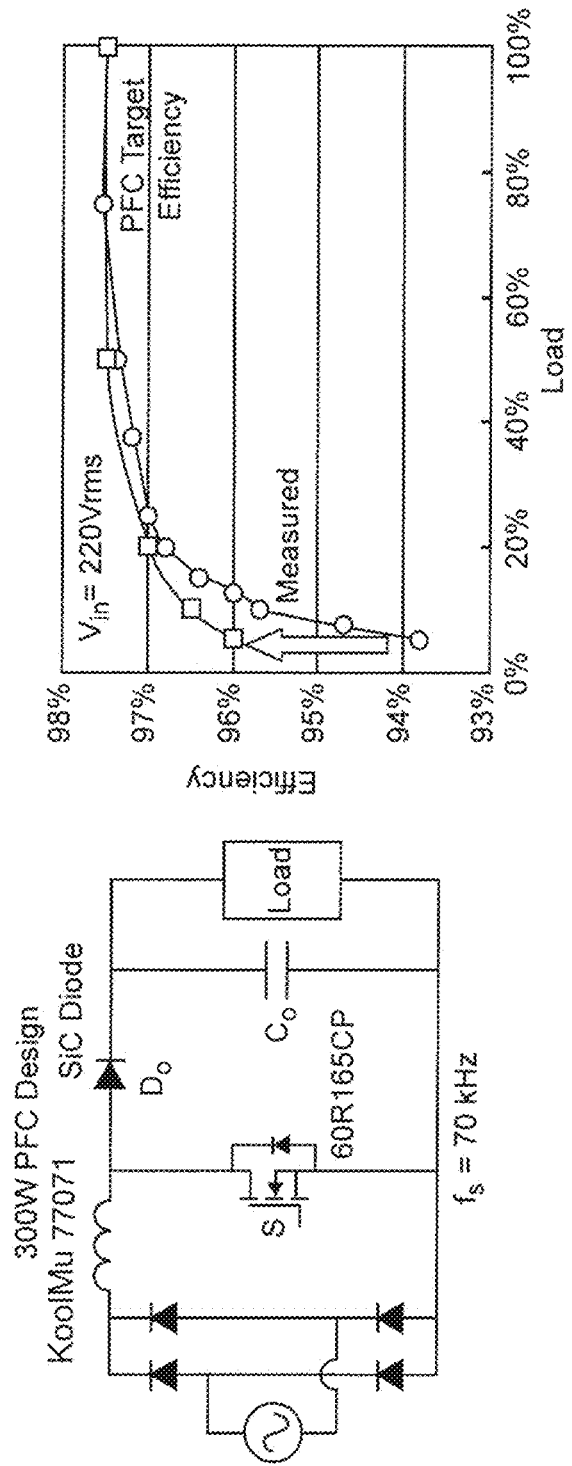
FIG. 3 is a graphical comparison of PFC stage target efficiency and efficiency of an exemplary current PFC stage circuit.

Referring now to FIG. 3, the PFC stage target efficiency is contrasted with the efficiency of current PFC stage circuits as a function of fractional load for an exemplary, simple 300 Watt PFC boost converter circuit design. Since current PFC stage circuits are designed and operated in much the same manner as DC-DC converter circuits, the efficiency profile of current PFC stage circuits is similar to that shown for DC-DC converters in FIG. 2. It should be appreciated that the overall efficiency of a front-end converter 125 is the product of the efficiencies of the PFC circuit 130 and the DC-DC converter 140, it can be easily understood that very low light load efficiency of the overall front-end converter will result and that, if the PFC stage light load efficiency can be raised above 95%, the light load efficiency of the overall front-end converter 125 can be improved to only slightly less than that of the DC-DC converter stage, alone, as alluded to above.

Figure 4:
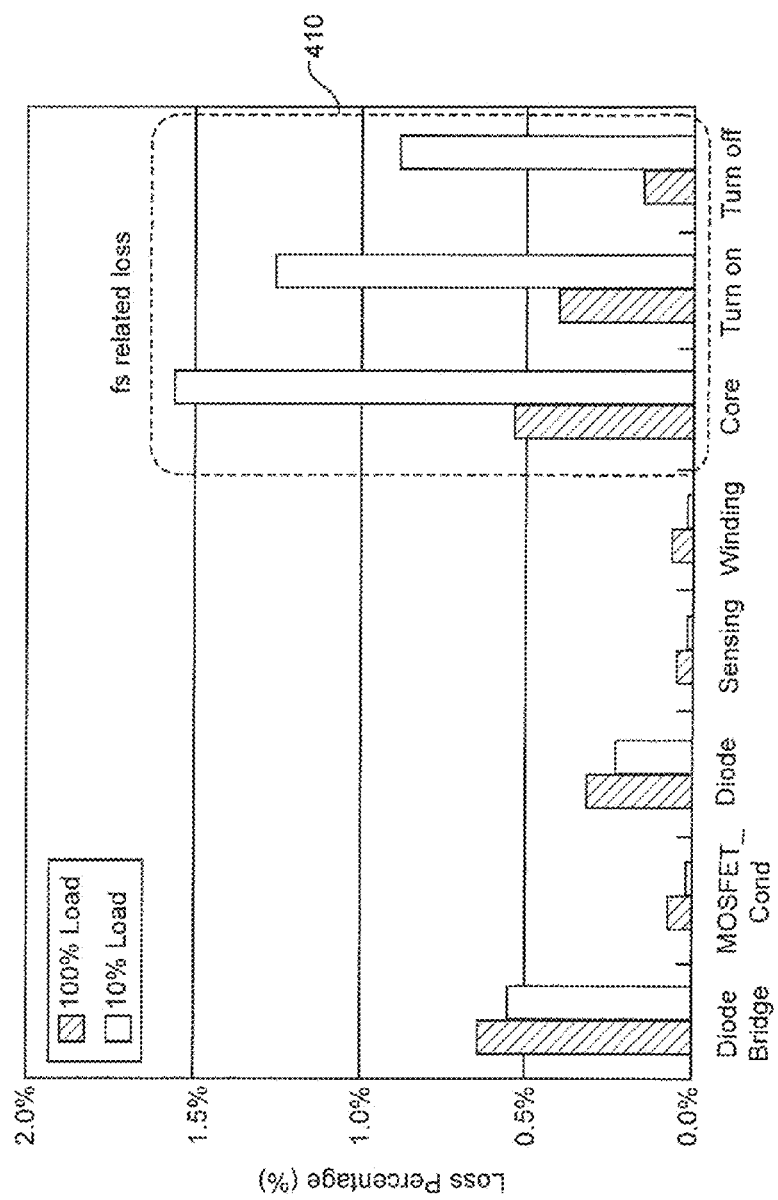
FIG. 4 is a graphical comparison of percentage losses attributable to various functions of a PFC circuit at full and light loads.

Referring now to FIG. 4, a percentage loss breakdown for the various operational functions of a PFC circuit of current design and operation are shown for 100% and 10% load. Switching frequency related losses comprising core losses, turn-on losses and turn-off losses are grouped together within dashed line 410. It can be readily seen that the percentage loss attributable to each of these types of losses increases greatly at light loads while other types of losses are generally reduced at light loads. Moreover, these switching frequency related losses are of a magnitude which dominates all other percentage losses at light loads.

Figure 5:
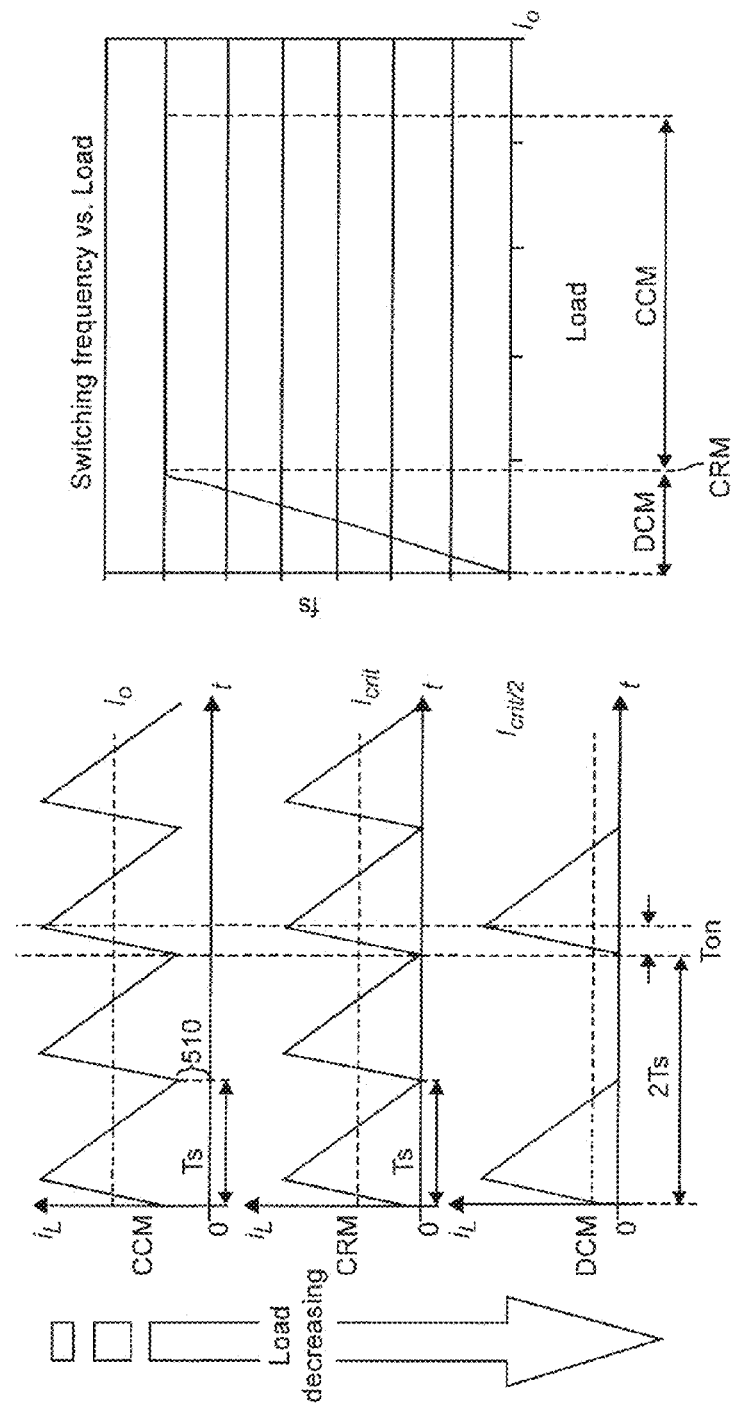
FIG. 5 illustrates the basic principles and exemplary operational waveforms of an exemplary buck converter or voltage regulator.
Figure 6:
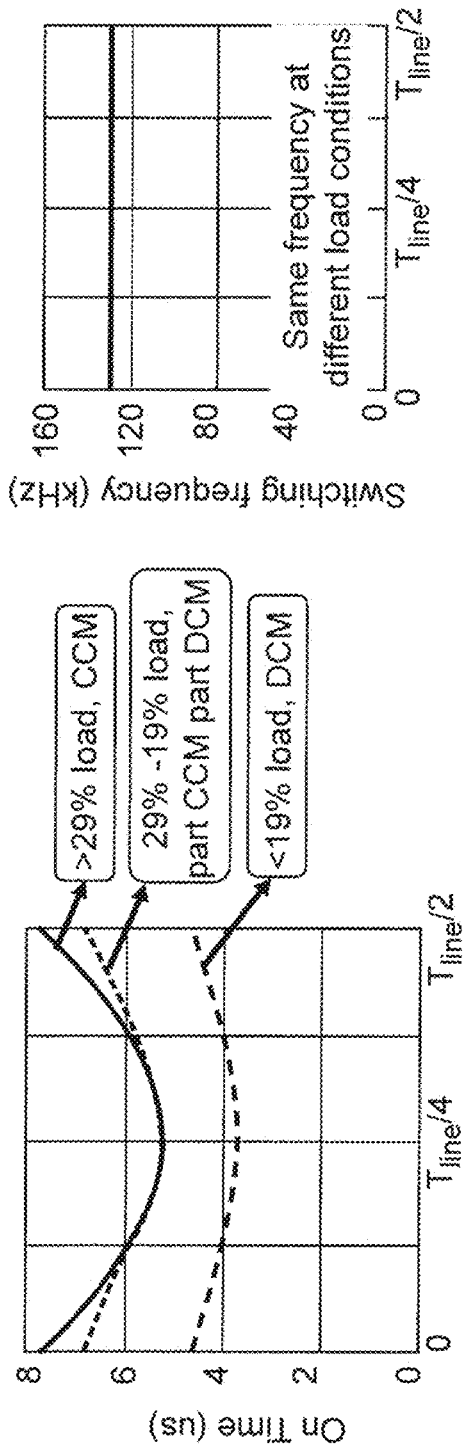
FIG. 6 illustrates on-time profiles for a PFC circuit operated at constant switching frequency at representative load levels.
Figure 7:
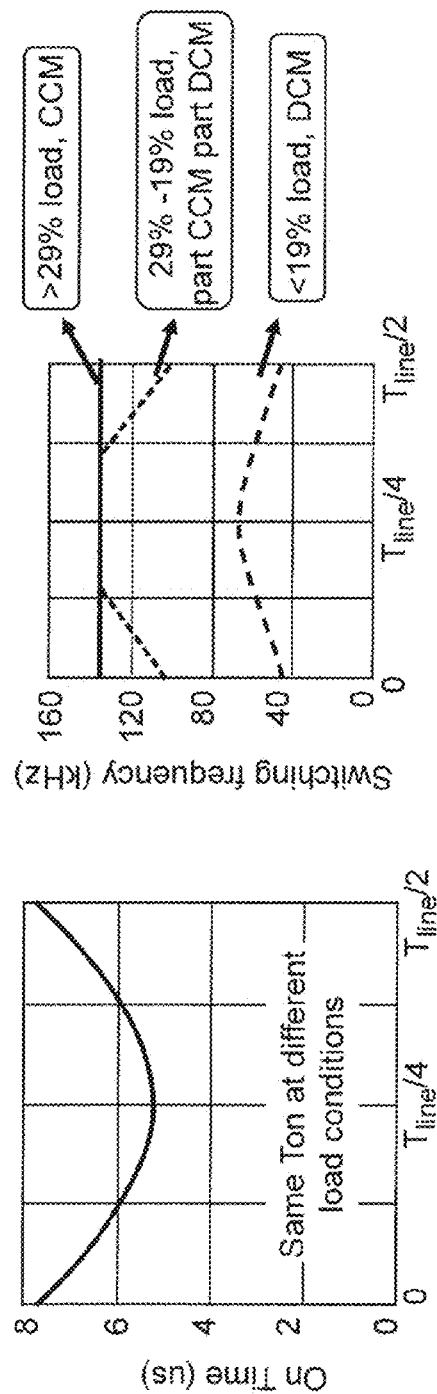
FIG. 7 illustrates operating frequency profiles of a PFC circuit to maintain a constant on-time profile at representative load levels.

Referring now to FIGS. 5-7, the basic principles of the invention will now be discussed. It should be noted that FIGS. 5 and 6 are provided and arranged to facilitate an understanding of the invention and, while principally representing circuit operation other than that provided by the invention, some modes of operation of the invention (e.g. operation at full load) are similar to circuit operation illustrated in FIGS. 5 and 6.

Therefore, no portion of either FIG. 5 or FIG. 6 is admitted to be prior art in regard to the present invention and these Figures are, accordingly, designated as "Related Art".

While FIG. 5 is directed to a DC-DC voltage converter or regulator rather than a PFC circuit and FIG. 6 is directed to a PFC circuit operated in a constant frequency mode rather than an adaptive on-time mode of operation provided by the invention, a discussion of the constant on-time operation of a voltage converter or regulator circuit as shown in FIG. 5 and an explanation of why the frequency reduction which is automatic in such a circuit does not occur in constant frequency operation of a PFC circuit as shown in FIG. 6 will be helpful in understanding the more complex operation of the PFC circuit in accordance with the invention including adaptive on-time operation. The operational waveforms illustrated in FIG. 5 are, for simplicity, characteristic of a buck voltage converter or regulator circuit but other topologies may produce waveforms of different shape.

As has been recognized, a constant on-time control in a voltage regulator (VR) provides automatic alteration of frequency at light loads and thus substantially improves efficiency of voltage converters and regulators at light load. Constant on-time control in DC-DC voltage converters and regulators automatically provides a reduction in frequency as the load becomes lighter. Specifically, while the instantaneous filter or inductor current, $i_L$, will fluctuate at the switching frequency (which is set to assure that the design load current can be delivered) due to connection to and disconnection from a substantially constant DC input voltage source, at heavy load, the average current, $I_o$, delivered to the load will be sufficiently high that $i_L$ will always be positive (e.g. greater than zero). That is, the constant frequency is chosen such that a further constant on-time pulse is delivered while the inductor remains in a free-wheeling condition following the previous pulse. Hence, this mode of operation is referred to as constant current mode (CCM) operation.

As the load is decreased, reducing $I_o$, it will reach a point where minima of $i_L$ reach zero. The average load to produce this condition is referred to (somewhat incorrectly) as the critical current, $I_{crit}$. Operation at this load is thus referred to (equally incorrectly) as critical conduction mode (CRM). Since the timing of the constant on-time pulses is controlled by feedback of the output voltage (which is pulled down as output current is drawn from the DC-DC converter or regulator) and compared with the input voltage, even lighter loads than $I_{crit}$ delay the occurrence of constant on-time switching control pulses and frequency is automatically reduced in proportion to the reduction in load (and the duration of "dead time" between on-time pulses is increased at loads below $I_{crit}$. Since the constant on-time switching pulses are separated in time for loads below $I_{crit}$, this mode of operation is referred to as discontinuous conduction mode (DCM).

For a PFC circuit which has an AC power supply (e.g. full-wave rectified AC voltage) rather than a substantially constant DC input, the operation is somewhat different in that constant switching frequency does not result in constant on-time. Conversely, $i_L$ will be greater when the input voltage is higher near the center of a half line periods of the AC input signal (e.g. where a half-sinusoidal waveform will vary from zero to reach a peak amplitude at $T_{line}/4$ and return to zero at $T_{line}/2$; hereinafter referred to as a half line period or half line cycle which is long compared to the switching frequency and will contain many switching cycles. Accordingly, it follows that at constant frequency and full load, the actual on-time (e.g. the period of conduction when the input voltage is greater than the sum of the output voltage and the voltage developed across the inductor/filter) will become shorter near the center of a half-line period (when the input voltage is high) and longer toward the ends of a half-line period (when the input voltage is low) but operation remains in the constant current mode (CCM), as shown in the graph on the left-hand side of FIG. 6.

As further shown in the left-hand side of FIG. 6, when the load is reduced below full load, the on-time is reduced at the constant switching frequency at the ends of the half line period. During these periods of each half line period near T=0 and $T=T_{line}/2$ when the input voltage is relatively low, the filter/inductor will conduct in the discontinuous conduction mode (DCM) and the conduction mode of any half line period will be CCM in the middle portion of the half line period near $T_{line}/4$ and the remainder in DCM.

As additionally shown in FIG. 6, as the load is further reduced, the periods of DCM operation in a half-line cycle will increase until the operation will become DCM throughout the half-line cycle period. In such a case, the on-time profile will separate from any portion of the full load CCM profile and the separation will increase as the load is decreased to lower levels. It should be kept in mind from the graph at the right-hand side of FIG. 6 that the frequency in this example is kept constant and, since the frequency is maintained constant, the switching frequency related losses remain dominant since conduction loss is very small at low load conditions even though such reduction in switching frequency and switching frequency related losses occurs inherently in a voltage converter or regulator operated at constant on-time, as discussed above in connection with FIG. 5.

Accordingly, to achieve reduction in switching frequency related losses and consequently improved efficiency at low loads in a PFC circuit, the invention, in accordance with its most basic principles seeks to develop an adaptive on-time function which will cause an automatic switching frequency reduction at light loads. To accomplish this function, the adaptive on-time control in accordance with the invention uses the on-time profile for full load, CCM-only operation of the constant frequency control operation, as described above to assure that the PFC circuit will be able to accommodate full design load and seeks to conform the on-time profile for lesser load levels to that CCM on-time profile by modification of switching frequency.

The full load, CCM-only profile of FIG. 6 is replicated in the graph on the left side of FIG. 7. This on-time profile, which can be expressed, for the constant frequency operation case, as $$T_{on}(t) = (V_o(t) - V_{in}(t))/V_o(t)f_{const}, \tag{1}$$

features shortening of on-time toward the center of each half line cycle, as described and discussed above, but does not change with the level of load. It should be appreciated that equation (1) is valid to describe the on-time profile for any constant frequency that may be chosen in consideration of the level of load to be met. Therefore, if a lesser load is to be met (e.g. when a load less than a full or lesser given load is detected) a switching frequency appropriate to that load can be chosen and the on-time profile for that load can be conformed to the on-time profile illustrated on the left side of FIG. 7. However, it should be noted that, in accordance with the invention, $f_{const}$ in equation (1) is preferably chosen based on the full load power level for which the PFC is designed. Normally, in conventional PFC circuits, $f_{const}$ would be chosen to be smaller than the full power level of the system in order to reduce switching losses.

The desired frequency profiles to maintain a consistent on-time profile for various loads are illustrated on the right-hand side of FIG. 7. It will be appreciated that the changes of frequency for respective load levels are similar in general characteristics to the on-time profiles for the same load levels in the constant frequency operation example for which data was illustrated in FIG. 6 and discussed above. That is, for a load level less than that which maintains CCM operation for the entire half line period (in this case, greater than 29% of full load at which point $i_L$ will fall to zero at the ends of switching periods at the switching frequency; a load level corresponding to $I_{crit}$ discussed above in connection with FIG. 5 and representing critical conduction mode (CRM) operation in a PFC circuit), the frequency is preferably reduced at the ends of the half line period and progressing, with reduction in load level toward the center of the half line period. The frequency is also preferably reduced linearly toward the ends of the half line period. The portion of the half line period at which the switching frequency appropriate to full load remains in CCM operation while DCM operation is produced during the portion of the half line period when frequency is reduced. When the load level is further reduced (e.g. below 19% of full load in this example), the frequency profile is separated entirely from the constant frequency used at full load during any part of the half line period and the separation will increase as load level is further reduced. It should be appreciated that the load level at which the "full load" switching frequency is reached only at the instant of $T_{line}/4$ in a half line period essentially corresponds to $I_{crit}$ and instantaneous operation at critical conduction mode (CRM) discussed above in connection with FIG. 5.

Figure 8:
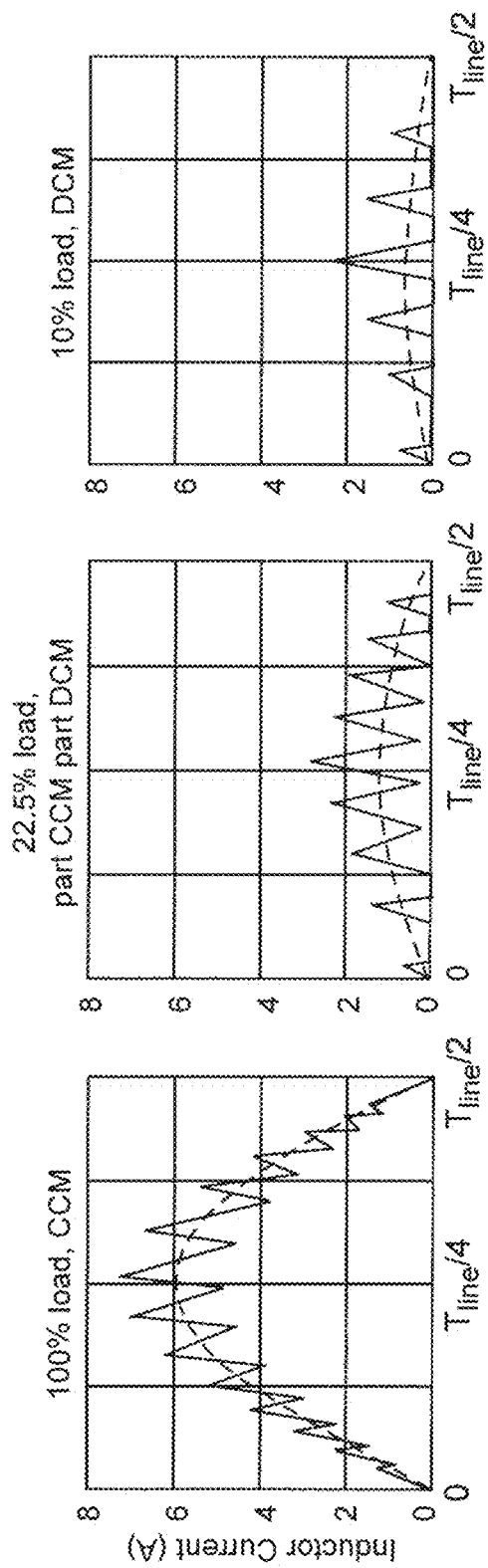
FIG. 8 illustrates inductor or filter current waveforms of a PFC circuit for the respective load levels illustrated in FIG. 7.
Figure 21:
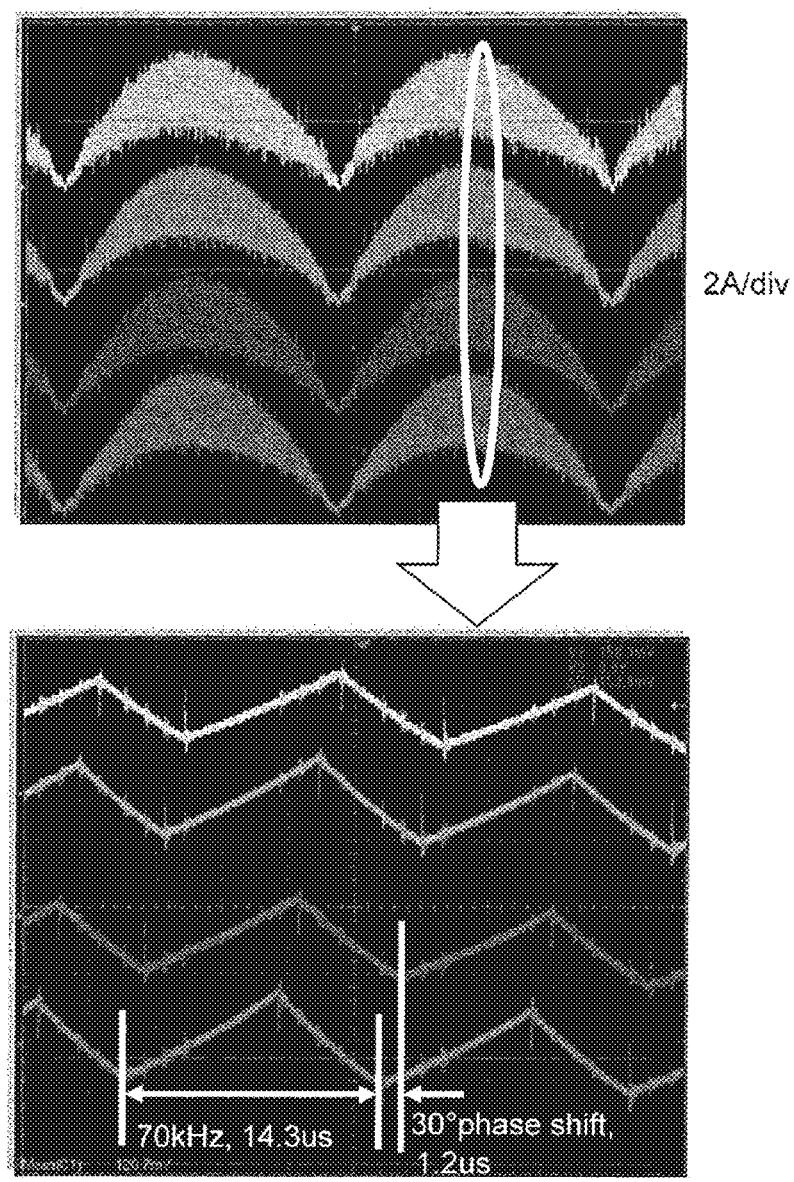
FIGS. 21 and 22 illustrate inductor current at heavy load and light load, respectively, FIGS. 23 and 24 graphically compare single-phase, constant frequency PFC efficiency and four-phase, adaptive on-time PFC efficiency at low line input and high line input, respectively.
Figure 22:
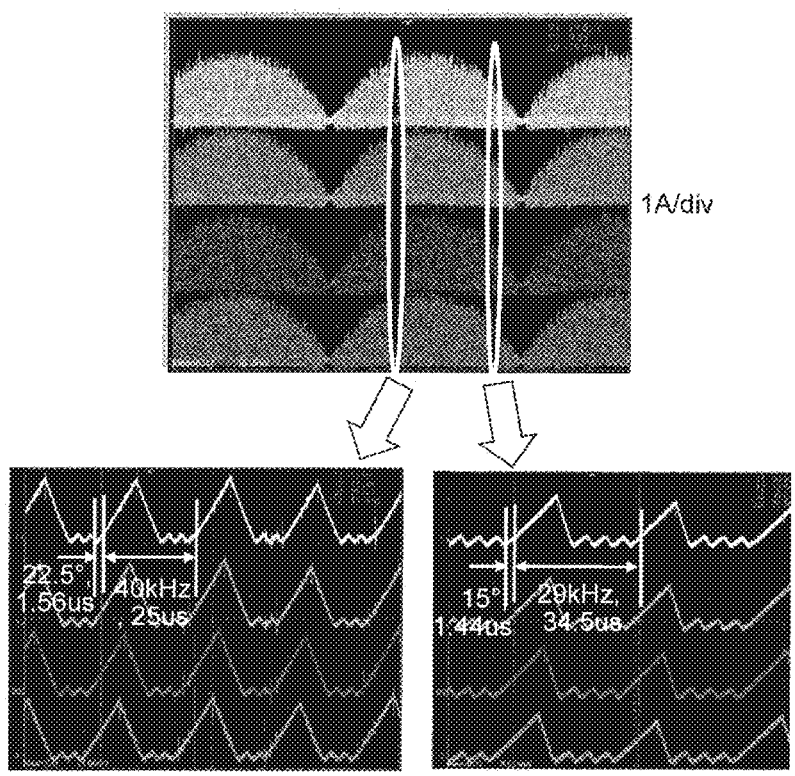

The inductor/filter current, $i_L$, can be visualized as shown in FIG. 8, although the switching frequency depicted therein is, for clarity, depicted as being much lower than is practical in a PFC circuit. (Waveforms of actual currents are shown in FIGS. 21 and 22.) For full load and intermediate loads which cause constant CCM operation, depicted at the left of FIG. 8, the frequency is constant and the instantaneous $i_L$ oscillates around a current that follows the half-sinusoidal input voltage. When the load level causes a combination of CCM and DCM operation within a half line period, the frequency will be constant near the center of the half line period and will be significantly reduced towards the ends of the half line period, as illustrated in the center graph of FIG. 8 and as can be seen as a difference in separation of the maxima and minima of $i_L$.

Note also that, near the center of a half-line period, the frequency becomes constant and the minima of the current waveform are greater than zero while, at the ends of the half-line period the minima are zero and a "dead time occurs" between current pulses. At even smaller loads (below 19% of full load in this example), the switching frequency is reduced below the "full load" switching frequency throughout the half line period, although some slight increase in frequency near the center of the half line period can be seen in the right-side graph of FIG. 8. Periods where $i_L=0$ (e.g. "dead time") between all peaks thereof indicates that the PFC circuit is operating in DCM throughout the half line period.

It should be appreciated that the switching frequency will change with instantaneous input voltage. By the same token, the switching frequency profile will change for "full load" operation (which term will be used hereinafter to be inclusive of intermediate loads where CCM operation will be maintained) with change of peak input voltage. In other words, as the peak (or RMS, etc.) input voltage is increased the on-time profile will change as shown at the lower left of FIG. 9 but on-time profiles for lesser loads can still be conformed thereto in the manner discussed above. In the case of an increased peak (or RMS, etc.) input voltage, the switching frequency profile required to conform the on-time profile to the "full load" frequency profile will also be adaptively scaled to operate as described above with corresponding reduction in switching frequency related losses.

Figure 9:
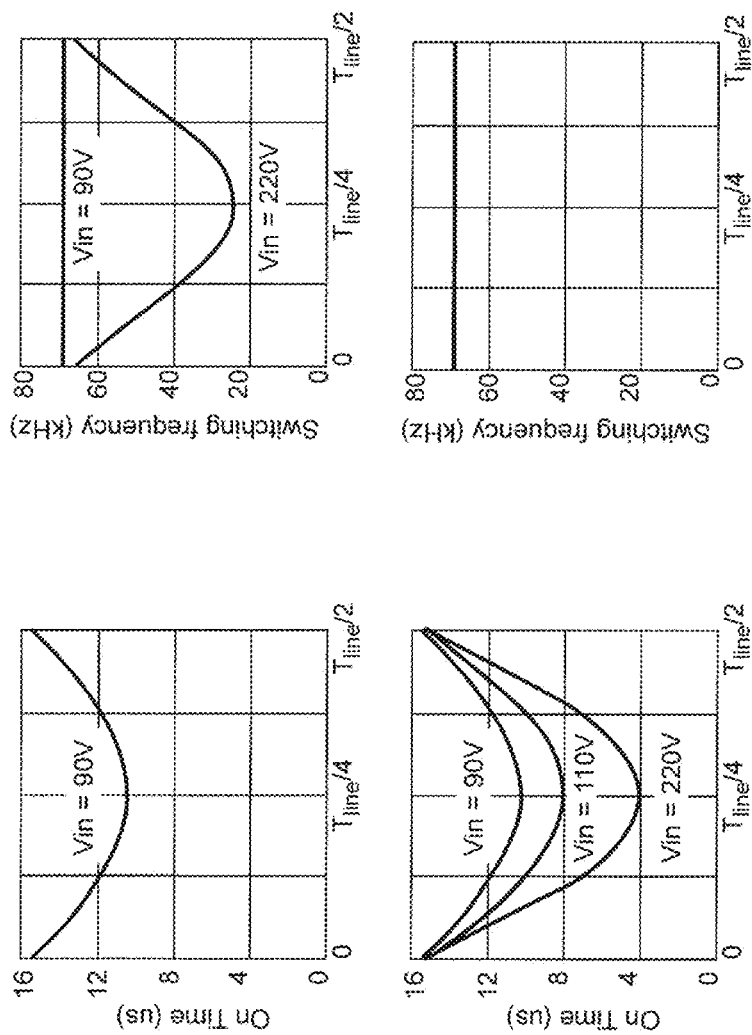
FIG. 9 illustrates operation of adaptive on-time operation for different input voltage levels.

More generally, however, FIG. 9 is intended to show that when the peak (or RMS, etc.) input voltage changes, the on-time profiles also changes accordingly based on the equation $$T_{on}(t)=(V_o-V_{inP}\sin(\omega t))/V_o f_{const},$$

assuming the waveform remains sinusoidal or half-sinusoidal. The shape of the on-time profile will also change with the instantaneous voltage and differently shaped waveform will also result in differently shaped on-time profiles. The purpose of changing on-time profiles is to maintain a constant operating frequency at heavy load. The reason is that if an on-time profile corresponding to a lower input voltage is used for a higher input voltage, the inductor current ripple would be very large, leading to high RMS inductor current loss. From the left side of FIG. 9, it can be seen that the on-time profile is reduced with higher input voltage. It should also be noted, in this regard, that the change in on-time with input voltage does not affect switching frequency related losses, particularly at heavy loads, but is discussed here to emphasize that the same electrical operation that causes a reduction in switching frequency at light loads also automatically and adaptively accommodates changes in input peak or RMS sinusoidal waveform magnitudes and even differently shaped input waveforms.

Figure 10:
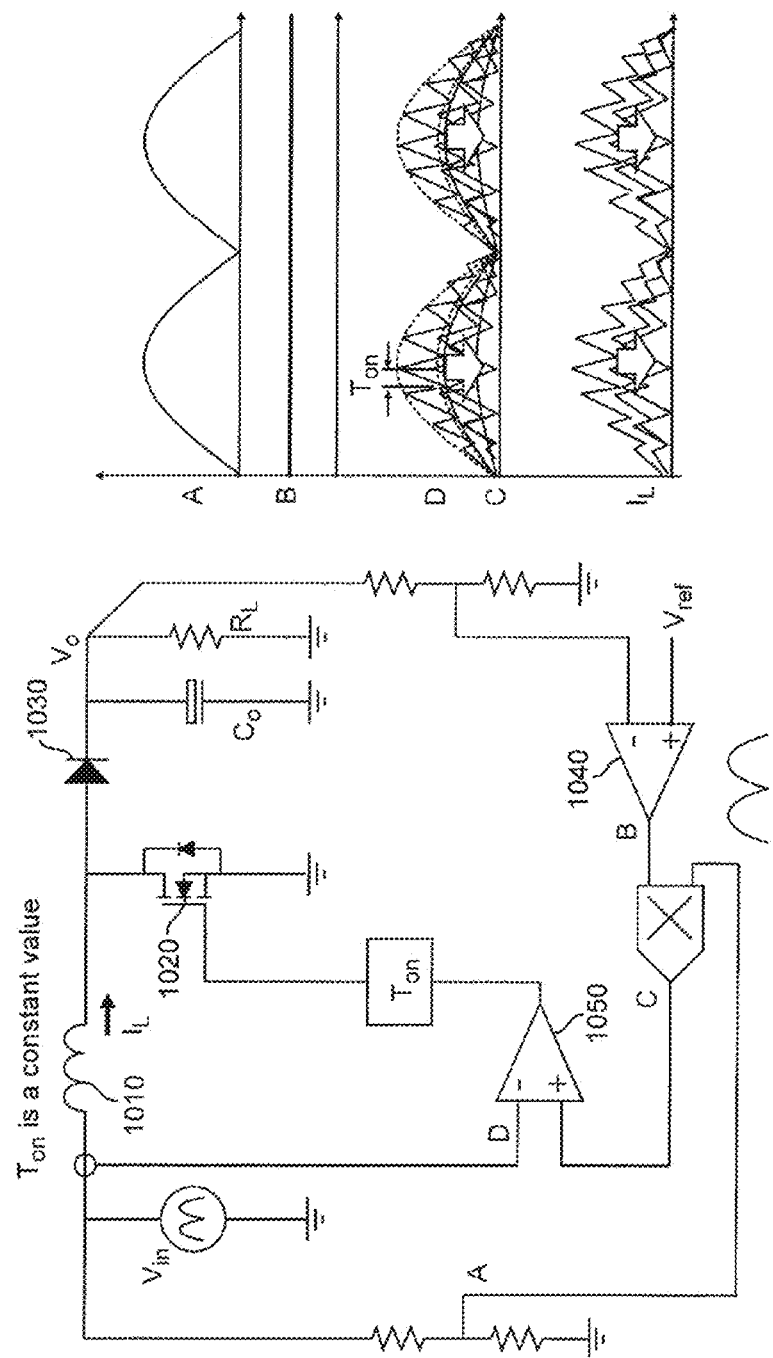
FIG. 10 illustrates a feedback circuit for providing the adaptive on-time functionality described above in connection with FIGS. 7-9.
Figure 11:
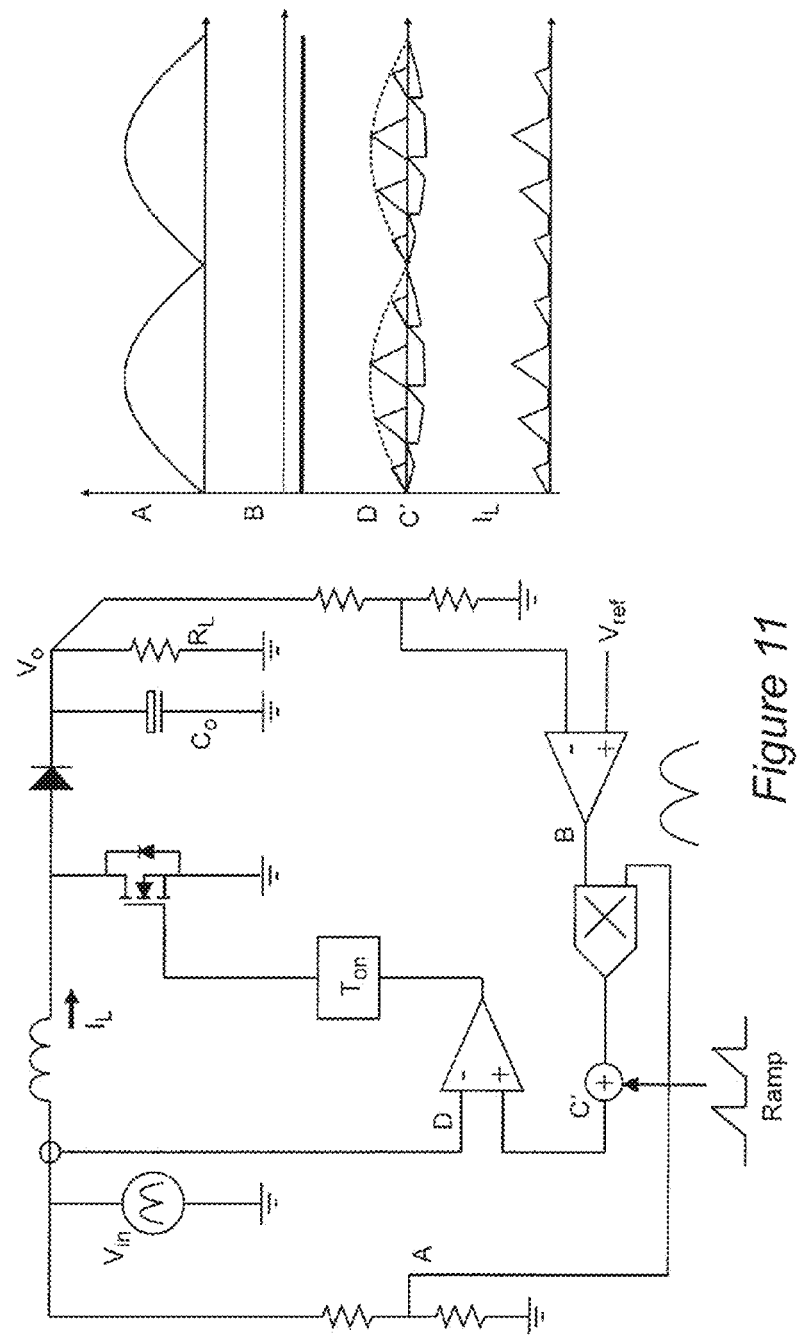
FIG. 11 is a flow chart of operations for digital calculation of adaptive on-time for differing loads by preferred digital predictive control.

Before proceeding to a discussion of how optimal adaptive on-time functionality can be easily obtained, the inventors have discovered that some of the above functionality can be roughly approximated in a PFC configured for operating with a constant on-time to achieve some degree of improvement in light load efficiency as will now be discussed in connection with FIGS. 10 and 11. FIG. 10 illustrates a feedback circuit arrangement applied, for example, to a boost converter type PFC circuit in which current is drawn through inductor 1010 by transistor 1020. When this current is then interrupted by transistor 1020, a large voltage higher than the input voltage is developed across inductor 1010 and produces a current $I_L$ which is provided to a filter capacitor, $C_o$, and the load, $R_L$, through diode 1030 which prevents reverse current flow when transistor 1020 is conductive. The feedback arrangement preferably includes resistive voltage dividers for both the input and output voltages and, in practice, can preferably be adjusted to tune the response of the PFC circuit. The output of the voltage divider at the PFC circuit output is compared at comparator 1040 with a reference voltage and multiplied with the output of the voltage divider on the input current source. The result is then compared at comparator 1050 with the input current and the result applied to a processor (preferably with analog to digital conversion at some point) for computing the time at which a constant on-time is to be applied to transistor 1020 as discussed below. As discussed above, under heavy load and high input voltage, the frequency will be increased near the center of the half line periods and, conversely, for lighter loads and/or at lower input voltage, the frequency will be decreased. However, this change in frequency is relatively slight and only occurs when the load closely approaches $I_{crit}$; above which the switching frequency related losses are not dominant. Further, while this control arrangement works well for CCM and CRM, it does not support pulse frequency modulation (PFM) for DRM. That is, the feedback circuit arrangement depicted in FIG. 10 has been found to work well for CCM and CRM conduction modes where there is no "dead time" between pulses which produces pulse frequency modulation (PFM), as discussed above in connection with FIG. 5 although a degree of frequency reduction is achieved in CRM operation. However, this feedback arrangement will not produce the full potential reduction in switching frequency possible for very light loads where periods of DCM operation occur because at such light loads where the output voltage is not significantly drawn down by output current, the output (B) of comparator 1040 will be negative and thus cause inversion of the output (C) of the multiplier and incorrect operation of the feedback circuit because comparator 1050 cannot trigger the adaptive $T_{on}$ computation and control while the feedback signal is negative. Essentially, the feedback circuit of FIG. 10 cannot provide the "dead time" between pulses required for full potential PFM and reduction of switching frequency related losses. Nevertheless, since the onset of severe switching frequency related losses occurs at a very low load level (typically below the 20% of full load for which efficiency requirements are currently specified, and many devices may not exhibit loads below that level, the feedback arrangement of FIG. 10 may have substantial application in many practical devices.

For other applications where loads less than 20% of full load may be presented, an additional input to the feedback circuit arrangement can provide PFM to arbitrarily low load levels. Specifically, as shown in FIG. 11 the addition of a ramp signal (preferably adjustable in slope allowing the arrangement to be tuned), which can be generated in a simple manner, to waveform C can be used to initiate the $T_{on}$ computation and control. Specifically, by sensing $I_L$ and starting generation of the ramp voltage when inductor/filter current returns to zero and adding the ramp to waveform C of FIG. 10, $T_{on}$ computation and control will be started when signal C' of FIG. 11 reaches zero (but is suppressed while C' is negative). At that point, the ramp can be terminated and resumed when the inductor/filter current again reaches zero. Ramp generation can thus be controlled with, for example, a pair of comparators and a few logic gates. Thus, PFM for arbitrarily light loads can be achieved with the feedback circuit arrangement of FIG. 11 by injecting a ramp signal into the feedback loop which suppresses the start of the next constant on-time control signal and introduces dead time between constant on-time signals although of durations not optimally corresponding to reduction of load. It should be recognized, however, that while performance of the arrangement of FIG. 11 may preferably be optimized by tuning the slope produced by the ramp voltage generator, the improvement in efficiency achieved for very light loads by simply extending a constant on-time operation into a DCM regime for reduction of switching frequency in a manner that is a rough approximation of adaptive on-time control provided by the preferred embodiment of the invention but that approximation is not, in fact, accurately adaptive and is not optimal and substantially greater improvements in efficiency may be achieved in the manner which will now be discussed in connection with FIGS. 12, and 13A and 13B.

Figure 12:
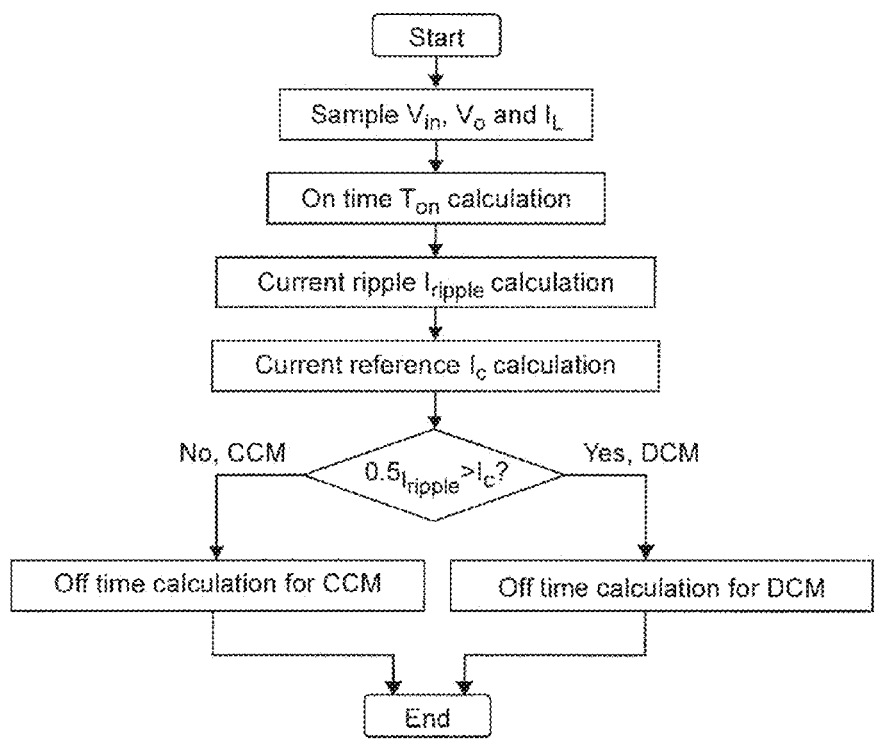
FIG. 12 is a flow chart of a procedure for predicting appropriate conduction mode for a given switching cycle in accordance with the invention.
Figure 13A:
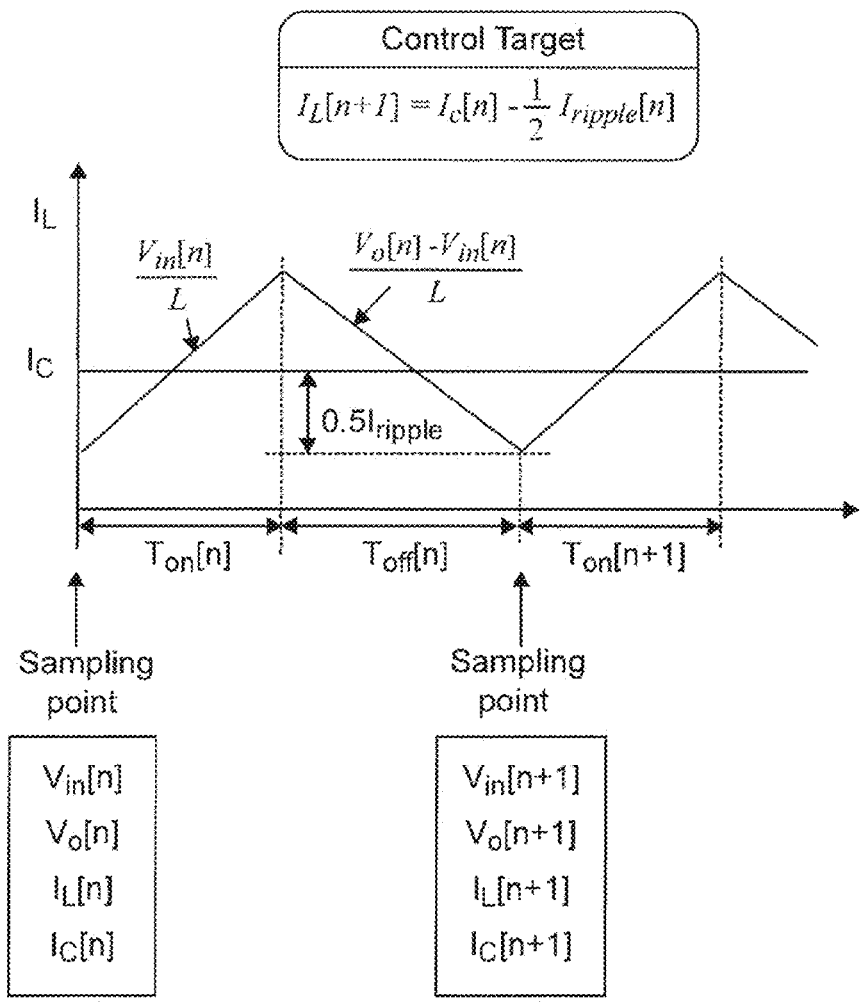
FIGS. 13A and 13B are graphical depictions of determination of off-time useful in understanding choice of control of operating conduction mode in accordance with the invention.
Figure 13B:
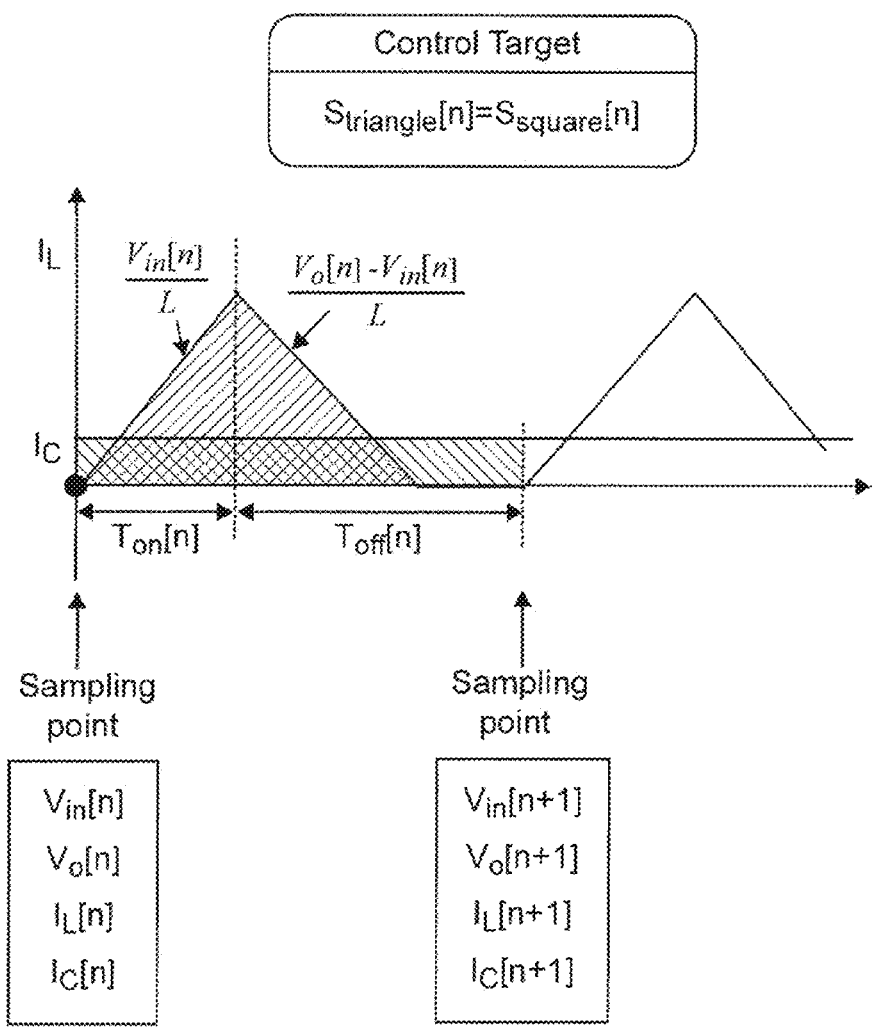

As shown in FIGS. 12, 13A and 13B, optimal improvement in light load efficiency through fully adaptive on-time control as described above can be achieved through a digital predictive method. Referring now to the flow chart of FIG. 12, in digital predictive control, the input voltage, $V_{in}$, inductor current, $I_L$ and output voltage, $V_o$, are sampled at the beginning of each switching cycle, the on-time and reference current, $I_c$, calculated and a determination is made whether the PFC circuit should be operated in CCM or DCM to deliver the next current pulse to the output filter and load. The adaptive on-time at the nth switch cycle is calculated in accordance with equation (1) above. After the on-time is obtained, the current ripple can be calculated as:

$$I_{ripple}[n] = (V_{in}[n]/L) / T_{on}. \quad (2)$$

The current reference, $I_c[n]$, can be obtained from the voltage feedback loop by multiplying the output of the voltage loop compensator and the sensed input voltage. Comparing $I_c[n]$ with half of the ripple current, the operational conduction mode for the current switching cycle can be chosen as CCM: $0.5 I_{ripple}[n] \leq I_c[n]$, or DCM: $0.5 I_{ripple}[n] > I_c[n]$.

The CCM and DCM control law is illustrated in FIGS. 13A and 13B. For CCM operation, the average inductor current can be controlled to be the same as the current reference if the inductor current at the end of a switching cycle is one-half the ripple voltage lower than the current reference as shown in FIG. 13A. For DCM operation, the area of the inductor current is controlled to be the same as the area of the rectangle formed by $I_c$ and the duration of the time span between consecutive sampling points as shown by hatching of the waveforms in FIG. 13B. In other words, for either CCM (where the triangles indicating increasing and decreasing inductor current are contiguous) or DCM (where the triangles indicating increasing and decreasing inductor current are separated) the areas above and below the average current must be the same and, in the case of DCM, that equality is achieved by the separation between the triangles which increases $T_{off}[n]$. Thus the off-time in CCM and DCM can be calculated as:

$$T_{offCCM}[n] = \frac{(I_L[n] + 1.5 I_{ripple}[n] - I_C[n])L}{(V_o[n] - V_{in}[n])} \quad (3)$$

$$T_{offDCM}[n] = \frac{V_o[n] \cdot I_{ripple}^2[n] \cdot L}{2(V_o[n] - V_{in}[n]) I_{c[n]}} - T_{on}[n]. \quad (4)$$

Figure 13C:
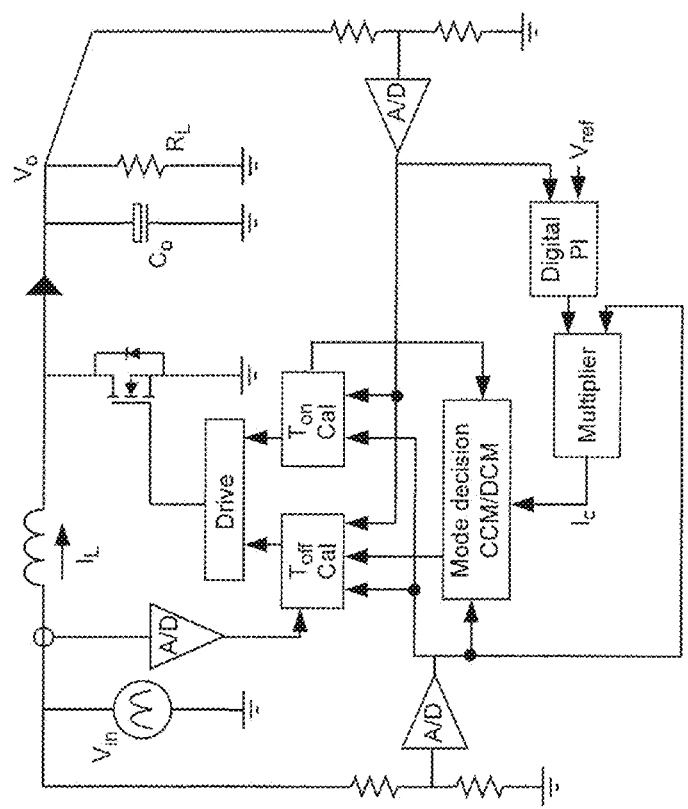
FIG. 13C is a high-level block diagram of a preferred system configuration for digital Adaptive on-time control in accordance with the invention.

A block diagram of the control arrangement for applying the above calculations to an exemplary boost power converter is shown in FIG. 13C. A voltage divider (and, preferably, an A/D converter) is preferably provided at both the input and output for adjustment of the control arrangement so that the input and output voltages are coordinated for proper operation of the control arrangement. Signals representing input and output voltages are provided to a processor for calculating both the on-time and off-time for a particular switching cycle as well as the signal representing the input voltage being supplied to a conduction mode decision control. (The calculated on-time signal is also fed back to the conduction mode decision control.) These signals. after passing the signal representing the output through a proportional-integral (PI) compensator where it is compared with a reference, are also multiplied to determine an average reference current, $I_c$, which is also input to the conduction mode decision control that applies the control law discussed above. The inductor/filter current is sampled and provided (preferably with A/D conversion) to a processor which calculates the off-time for the next switching cycle. It should be noted that the on-time and off-time are computed for each switching cycle but the particular algorithm discussed above chosen to compute the off-time will be controlled responsive to the conduction mode decision which is also responsive to the result of the on-time calculation. The on-time and off-time calculation results are provided to an appropriate drive circuit for driving the switch(es) of the power converter.

Figure 14:
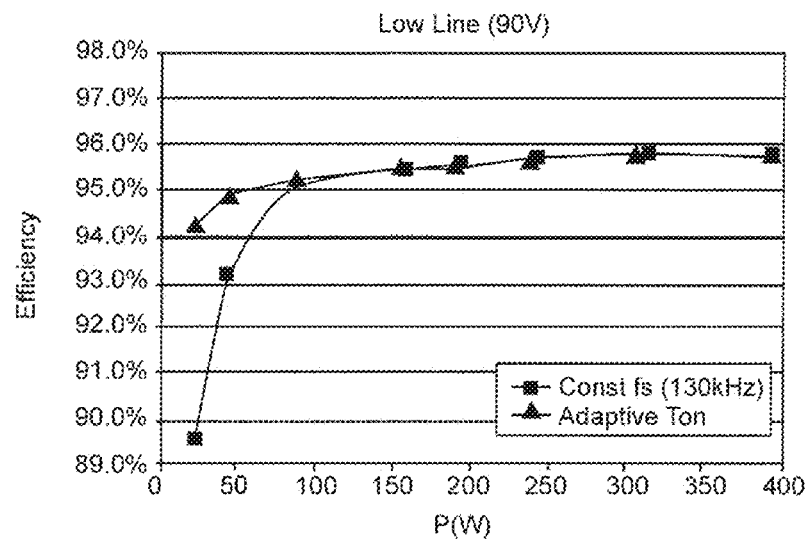
FIGS. 14 and 15 are comparative graphs of efficiency of the adaptive on-time control in accordance with the invention and constant frequency control, illustrating the efficacy of the invention to reduce switching frequency related losses.
Figure 15:
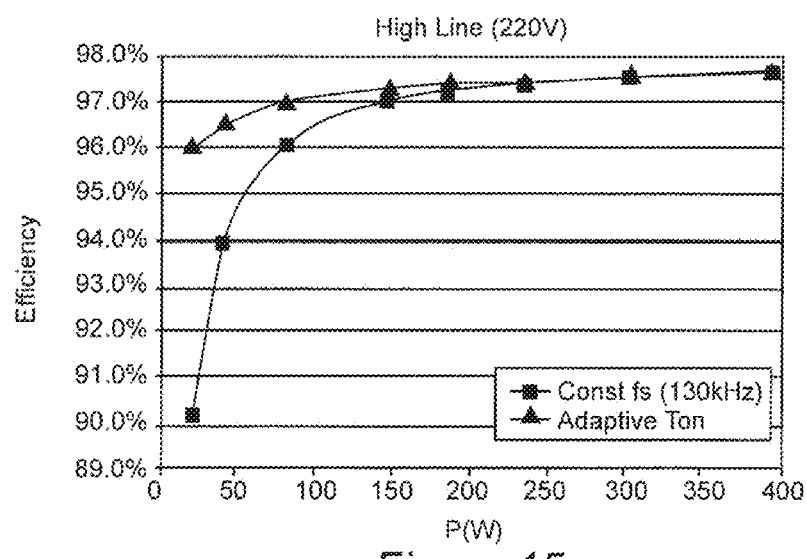

The improvement in efficiency at low load levels has been verified for both low and high line or input voltages as shown in FIGS. 14 and 15. In either case, the heavy load efficiency is substantially the same as with constant frequency control and in CCM operation (well above a load level resulting in CRM operation), the switching frequency produced by adaptive on-time control in accordance with the invention will, in fact, be constant. At lighter loads at or below CRM where DCM operation will be produced in a portion or the entirety of a half line period, the reduction in frequency provided by automatic PFM in accordance with the invention significantly reduces switching frequency and turn-on, turn-off and core losses related thereto such that a substantial gain in efficiency can be obtained in a relatively simple manner. Current sampling at the beginning of each switching cycle and determining if that switching cycle will be operated in DCM (where the off-time will be extended) or CCM (where off-time will not be extended) allows shifting between DCM and CCM, or vice-versa, as required for optimal frequency control within half line periods.

Figure 16:
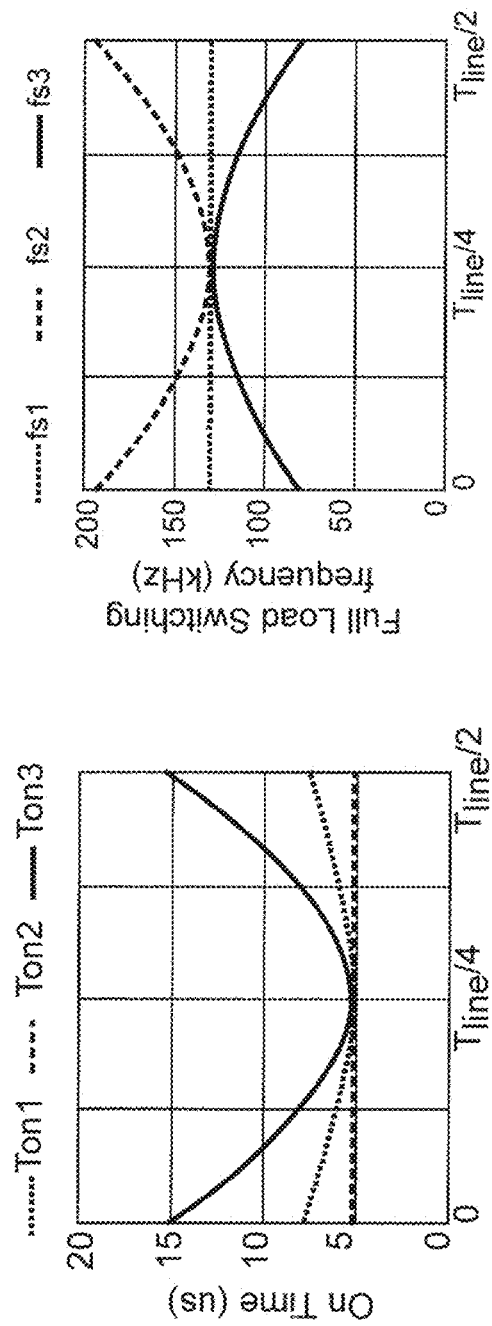
FIG. 16 illustrates possible variation of on-time profile and corresponding variation of switching frequency as possibly advantageous implementations of the invention.

It should also be appreciated from the foregoing description of the invention, that the on-time profile need not be the same as the full load on-time profile of constant frequency operation but can be arbitrarily set to any profile found to be desirable. When the on-time profile is changed, the frequency profiles will be adaptively changed accordingly. The on-time profile within a half line cycle or period could, in fact, be any user defined shape (as may be advantageous when particular load levels are anticipated in a particular application of the invention) without departing from the most basic principles of the invention. For example, as shown in FIG. 16, the on-time can be as described above, leading to a constant frequency in CCM. Alternatively, the on-time can be held constant leading to a higher switching frequency at ends of the half line period. Conversely, a larger on-time could be chosen; resulting in a further reduction in switching frequency at all load levels. In any case, in accordance with the principles of the invention, the switching frequency will be significantly reduced at light loads regardless of the on-time profile chosen.

As a perfecting feature of the invention, a multi-phase application which provides substantial advantages in allowing simplification and reduction of EMI filter size and cost will now be described. It would be expected by those skilled in the art that variation of switching frequency in a power converter would lead to complications in regard to EMI filter design, as alluded to above. While it has been shown in the foregoing discussion of the invention, that substantial light load efficiency improvements can be achieved in a relatively simple manner in accordance with the invention, EMI noise considerations could cause power converters including the invention to be impractical for some applications if the required complexity of EMI filtering was sufficiently great to significantly increase size, weight and/or cost of the overall power converter.

Figure 17:
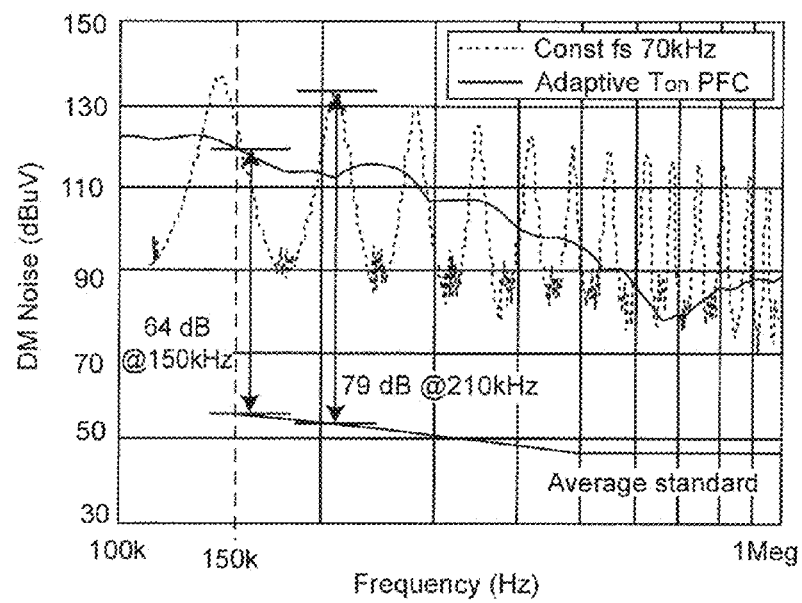
FIG. 17 is a graphical comparison of DM noise of a single-phase embodiment of the adaptive on-time PFC in accordance with the invention and a constant frequency PFC.

The average differential mode (DM) noise comparison of single phase, adaptive on-time PFC and a comparable constant frequency PFC are shown in FIG. 17. The noise peak of the constant frequency PFC at each order of switching harmonic can be clearly identified. The EMI noise of the adaptive on-time PFC in accordance with the invention is a continuously changing curve because the switching frequency varies in a half line cycle when any portion of the half line cycle is operated in DCM, as will generally be the case. Thus the EMI noise of the adaptive on-time PFC presents a much wider frequency band.

Based on the tested EMI noise magnitude, in order to meet present noise standards, the corresponding attenuation requirement can be identified. For DM noise, the single phase, adaptive on-time PFC need 64 dB attenuation at 150 KHz, while the single phase, constant frequency PFC needs 79 dB attenuation at 210 KHz. From these frequencies, the filter corner frequency can be calculated, yielding a filter corner frequency of 33.5 KHz for the adaptive on-time PFC and 33.4 KHz for the constant on-time PFC. For common mode (CM) noise, if known balance techniques are applied, the CM noise of the PFC is very small and can be neglected. CM noise is mainly determined by the downstream DC/DC converter or voltage regulator and the magnitude and frequency spectrum thereof can be used for EMI filter design.

It is known that multi-phase interleaving is an effective way to reduce noise due to ripple cancellation and that if the switching frequency and phase number are properly selected in a fixed frequency, multi-phase PFC, the phase shift angle is a fixed value. However this is not necessarily the case for an adaptive on-time PFC in accordance with the invention since the frequency is variable.

Figure 18:
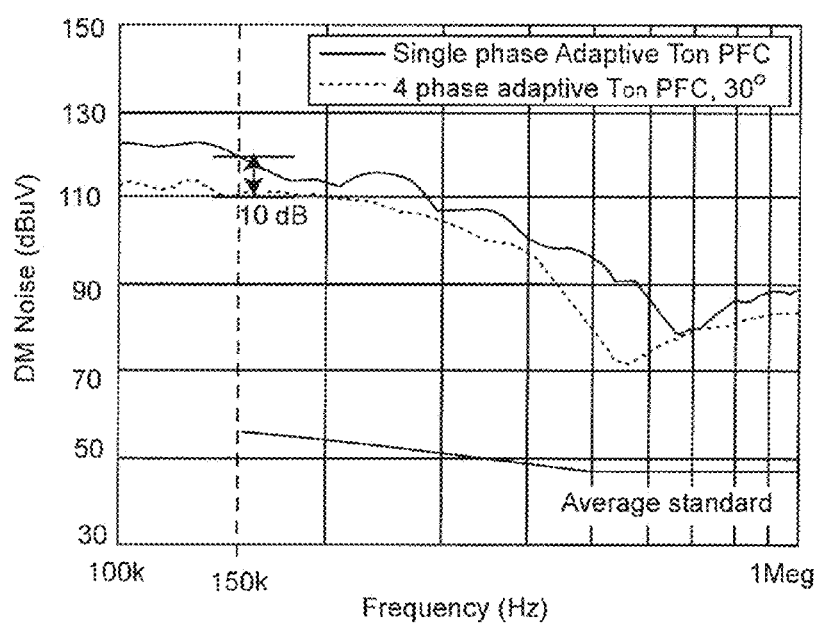
FIG. 18 is a graphical comparison of EMI noise of a single-phase embodiment of the adaptive on-time PFC in accordance with the invention and a four-phase adaptive on-time PFC with 30° phase shift.

As discussed above in connection with FIG. 7, switching frequency changes with load variation. As noted in regard to FIG. 17, the EMI spectrum is a continuous curve and, therefore, the EMI filter will always be based on noise magnitude at 150 KHz. In order to reduce the noise magnitude at 150 KHz, proper phase shift angle for a multi-phase PFC should be chosen. There are many sources of the 150 KHz harmonic such as the third harmonic of a 50 KHz ripple, fourth harmonic of a 37.5 KHz ripple, fifth harmonic of a 30 KHZ ripple, etc. Among these sources, the third harmonic of a 50 KHz ripple is dominant. If the phase shift angle is chosen to be 30°, the third harmonic of 50 KHZ will be completely canceled with four phase interleaving, a comparison of the single phase, adaptive on-time PFC with a four phase, adaptive on-time PFC is shown in FIG. 18 in which it can be seen that DM noise at 150 KHz is reduced by about 10 dB due to third harmonic cancellation of 50 KHZ ripple although substantial DM noise remains at 150 KHz.

Figure 19:
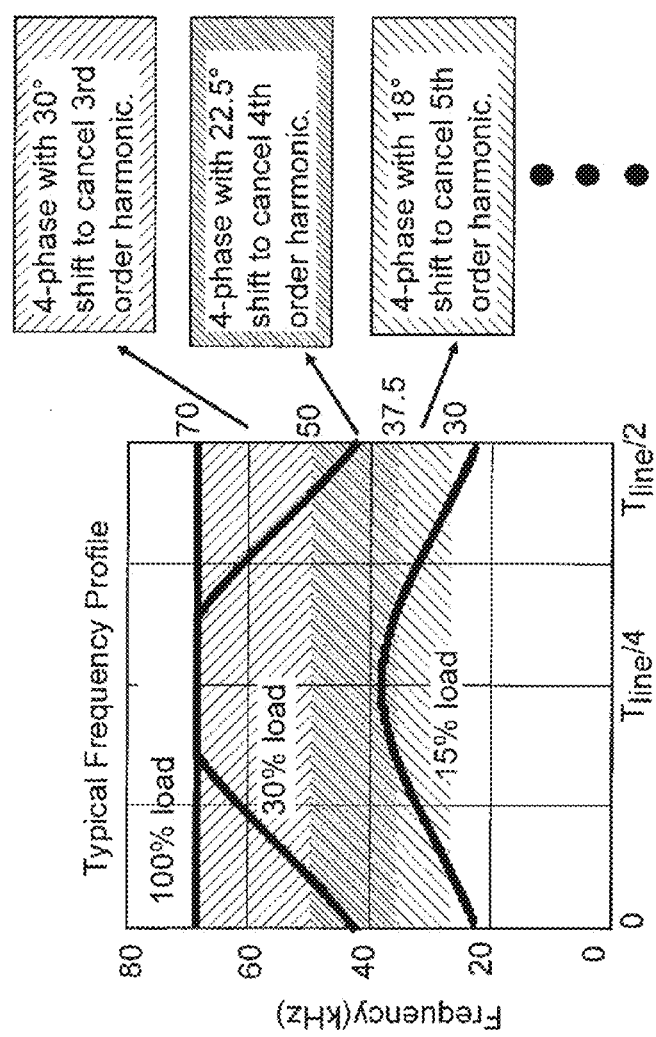
FIG. 19 illustrates adaptive angle selection for an adaptive on-time PFC in accordance with a perfecting feature of the invention.
Figure 20:
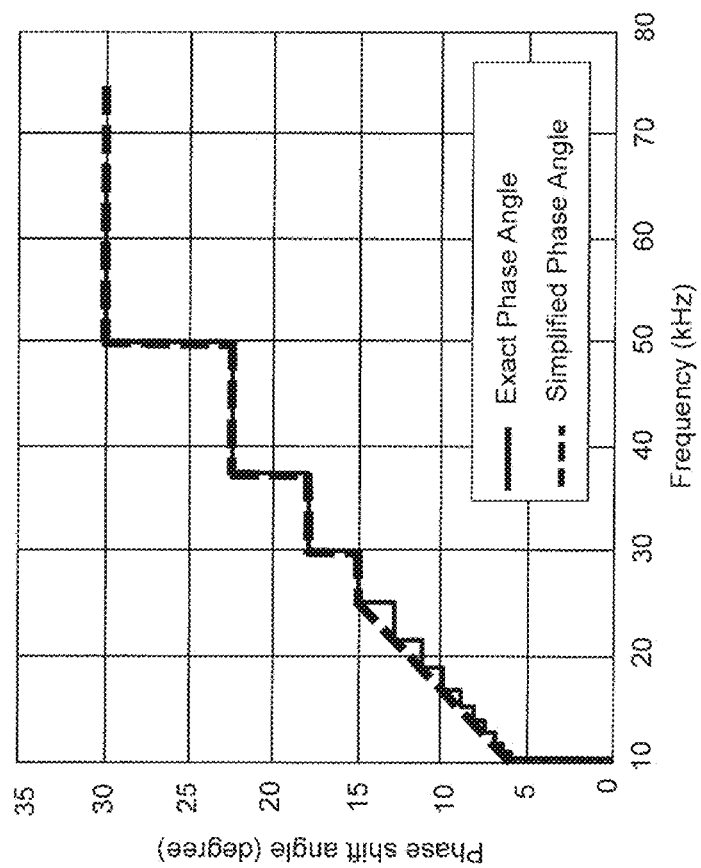
FIG. 20 illustrates phase angle selection at different switching frequencies.

Thus, there are still 150 KHz noise contributions from higher order harmonics of lower frequency ripple which the fixed phase angle is not able to cancel. The best technique for cancellation of 150 KHz DM noise, in accordance with a perfecting feature of the invention, is to provide adaptive phase angle control. The basic concept of adaptive phase angle control is illustrated in FIG. 19. In essence, when the switching frequency is between 50 KHZ and 70 KHz, the third harmonic of the switching frequency is dominant. So 30° phase shift will provide total cancellation of third order harmonics in a four phase PFC. As the switching frequency is changing, the same principle applies. For example, if the switching frequency shifts with diminished load to between 35.5 KHz and 50 KHz, the fourth harmonic of the switching frequency is dominant and 22.5° phase shift between phases of a four phase PFC would totally cancel the fourth harmonic, and so on for lower switching frequencies which the adaptive on-time control in accordance with the basic principles of the invention can reach in reducing switching frequency related losses. The proper phase shift angle at other, lower frequency ranges and a preferred simplification thereof is summarized in FIG. 20. The simplification where the steps of the phase shift versus frequency function of FIG. 20 and difficult to implement is possible and effective because the inductor current ripple is reduced at lower frequencies and constitutes a very small contribution to EMI noise and total cancellation of harmonics is less critical at low switching frequencies. Thus it is preferred that the phase angle at frequencies below 25 KHz be approximated by a linear function which is illustrated as a dashed line in FIG. 20. It should also be understood that while an exemplary four phase adaptive on-time PFC has been described and is preferred in regard to EMI noise cancellation between phases of a multi-phase PFC, other numbers of phase can be used and will imply different angles to achieve EMI noise cancellation.

Figure 23:
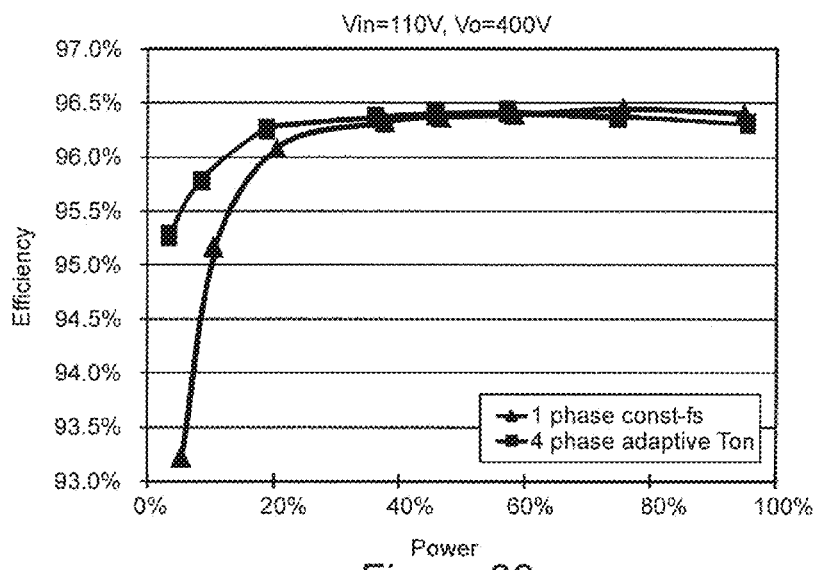
Figure 24:
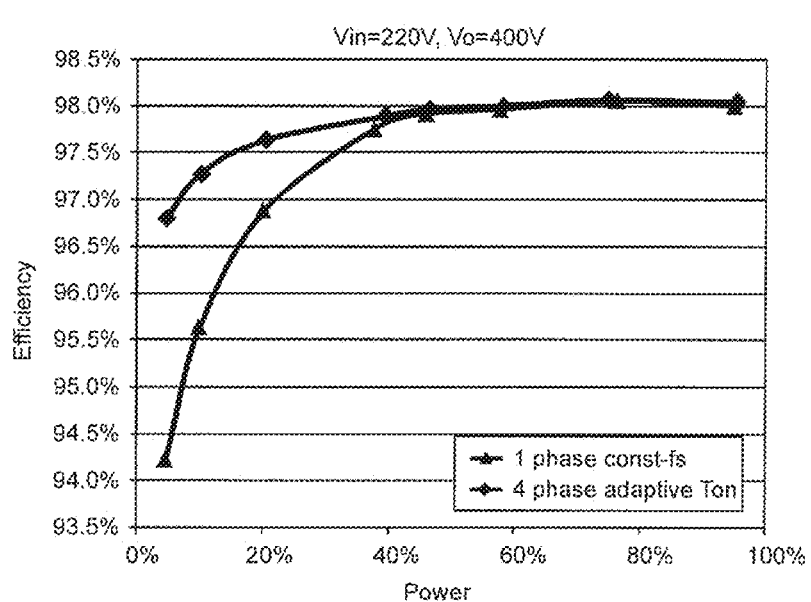

The ability of a four phase, adaptive on-time PFC to perform as discussed above has been experimentally verified and the operational waveforms for light and heavy loads are shown in FIGS. 21 and 22, respectively. These waveforms closely resemble the theoretical waveforms of FIG. 8 (other than in switching frequency which was reduced for clarity of illustration in FIG. 8, as noted above) and FIGS. 13A and 13B. The phase shift angle can also be observed to change correctly. The gain in efficiency for both high and low input voltage is shown in FIGS. 23 and 24, from which it is seen that the efficiency loss in a four phase embodiment is not significantly greater than the single phase PFC in accordance with the invention and both are an improvement of=ver constant frequency PFC circuits.

Figure 25:
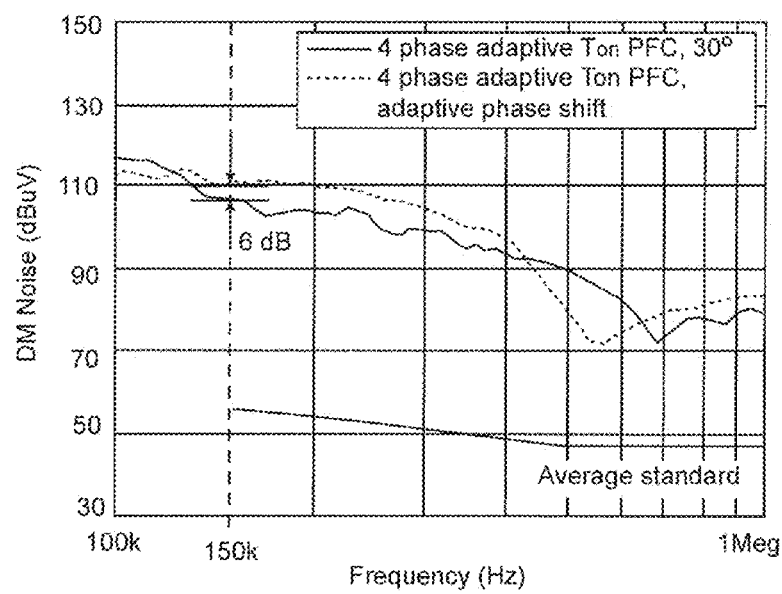
FIG. 25 is a graphical comparison of EMI noise of four-phase, adaptive on-tome PFCs with 30° phase shift and adaptive phase shift.

The tested DM noise with fixed 30° phase shift and adaptive phase shift are compared in FIG. 25. It can be seen that adaptive phase shift provides and additional 6 dB of noise cancellation at 150 KHz of the 30° fixed phase shift embodiment. Based on the tested noise magnitude, the DM filter corner frequency can be calculated at 49 KHz; an approximately 16 KHz increase. Thus, the combined CM and DM filter can be reduced in size by about one-half and is not of increased complexity or cost. Thus, the invention provides a PFC circuit and overall front end power supply which can be manufactured at lower size and cost with no penalty in light load efficiency.

While the invention has been described in terms of a single preferred embodiment and a perfecting feature thereof, those skilled in the art will recognize that the invention can be practiced with modification within the spirit and scope of the appended claims.

Having thus described our invention, what we claim as new and desire to secure by Letters Patent is as follows:

1. A method of operating a power factor correction circuit, said method comprising steps of
applying a cyclically varying voltage to an input of said power factor correction circuit,
performing switching to control conduction of pulses of current at said cyclically varying input voltage to a filter/inductor at a frequency, which is sufficiently high to supply a predetermined current at a desired output voltage to a load, said switching defining a predetermined on-time and a predetermined off-time in accordance with said predetermined current and said desired output voltage and defining a switching cycle such that current through said filter/inductor is continuous in a continuous conduction mode, reducing said predetermined current supplied to supply a reduced current to said load, determining if said reduced current is less than one half of a current ripple produced by said switching on-time and off-time, and if said reduced current is less than one-half of said current ripple, reducing said frequency of said pulses by extending said off-time during at least a portion of a cycle of said cyclically varying voltage in accordance with said reducing of said predetermined current such that current through said filter/inductor is discontinuous in a discontinuous conduction mode.

2. The method as recited in claim 1, wherein said step of reducing said frequency is performed adaptively to said step of reducing said predetermined current.

3. The method as recited in claim 2, wherein said on-time is adaptively varied in accordance with said desired output voltage and said cyclically varying input voltage.

4. The method as recited in claim 3, including further steps of sampling said input voltage, said output voltage and said current through said filter/inductor to provide sampled data for a said switching cycle, selecting between said continuous conduction mode and said discontinuous conduction mode for said switching cycle, and computing said off-time in accordance with said continuous conduction mode or said discontinuous conduction mode selected in said selection step.

5. The method as recited in claim 4, wherein said sampling step is performed once for a given switching cycle.

6. The method as recited in claim 5, wherein said sampling step is performed once for each said switching cycle.

7. The method as recited in claim 4, including the further step of computing an average current through said filter/inductor.

8. The method as recited in claim 7, including a further step of determining a ripple current through said filter/inductor wherein, in said selecting step, continuous conduction mode is selected if said average current is greater than one-half said ripple current and said discontinuous conduction mode is selected if said average current is less than one-half said ripple current.

9. The method as recited in claim 1, wherein said on-time is adaptively varied in accordance with said desired output voltage and said cyclically varying input voltage.

10. The method as recited in claim 9, including further steps of sampling said input voltage, said output voltage and said current through said filter/inductor to provide sampled data for a said switching cycle, selecting between said continuous conduction mode and said discontinuous conduction mode for said switching cycle, and computing said off-time in accordance with said continuous conduction mode or said discontinuous conduction mode selected in said selection step.

11. The method as recited in claim 10, wherein said sampling step is performed once for a given switching cycle.

12. The method as recited in claim 11, wherein said sampling step is performed once for each said switching cycle.

13. The method as recited in claim 10, including the further steps of computing an average current through said filter/inductor, and determining a ripple current through said filter/inductor wherein, in said selecting step, continuous conduction mode is selected if said average current is greater than one-half said ripple current and said discontinuous conduction mode is selected if said average current is less than one-half said ripple current.

14. A power converter circuit comprising a switching circuit configured to conduct pulses of a cyclically varying voltage to a filter/inductor, an output for delivering a predetermined voltage developed by said filter/inductor to a DC/DC converter or a load, a controller for controlling said switching circuit to determine an on-time duration and an off-time duration in accordance with a current delivered to said DC/DC converter or said load at a desired voltage, wherein said controller determines said off-time to establish one of a continuous conduction mode or a discontinuous conduction mode for respective pulses of said cyclically varying voltage in accordance with a magnitude of said current being greater or less than one-half of a ripple current due to said on-time and said off-time and wherein, during said discontinuous conduction mode, said controller controls said switching circuit such that said off-time includes periods of variable duration when substantially zero current flows through said filter/inductor and frequency of said pulses is thereby reduced when said current is reduced.

15. The power converter circuit as recited in claim 14, wherein said power converter circuit is a power factor correction circuit.

16. The power converter circuit as recited in claim 14, wherein said controller selects a continuous conduction mode or a discontinuous conduction mode for computation of said off-time based on ripple current in said filter/inductor and an average current delivered to said DC/DC converter or said load.

17. The power converter circuit as recited in claim 14, wherein said on-time is adaptively changed in accordance with load current delivered to said DC/DC converter or load.

18. The power converter circuit as recited in claim 14, further including at least one additional switching circuit to conduct pulses of a cyclically varying voltage to at least one additional filter/inductor, and said controller produces signals to drive said at least one additional switching circuit with a selectable phase angle different from that of said switching circuit.

19. The power converter circuit as recited in claim 18, wherein said phase angle is selected to cancel a harmonic of a frequency of said pulses.

20. The power converter circuit as recited in claim 19, wherein said selected phase angle is adaptively changed in accordance with frequency of said pulses.

* * * * *